US012206523B2

(12) United States Patent
Drury et al.

(10) Patent No.: US 12,206,523 B2
(45) Date of Patent: Jan. 21, 2025

(54) SYSTEMS AND METHODS FOR DETERMINING A TOPOLOGY OF AN ETHERNET RING OF DEVICES IN A BUILDING MANAGEMENT SYSTEM

(71) Applicant: Johnson Controls Technology Company, Auburn Hills, MI (US)

(72) Inventors: Eric J. Drury, Lake Zurich, IL (US); Sergey A. Galchenko, Mequon, WI (US); David P. Owczarski, Cudahy, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 783 days.

(21) Appl. No.: 16/773,203

(22) Filed: Jan. 27, 2020

(65) Prior Publication Data

US 2020/0162285 A1    May 21, 2020

Related U.S. Application Data

(63) Continuation-in-part of application No. 16/206,614, filed on Nov. 30, 2018, now Pat. No. Re. 48,443,
(Continued)

(51) Int. Cl.
| | |
|---|---|
| *H04L 12/24* | (2006.01) |
| *F24F 11/58* | (2018.01) |
| *F24F 11/63* | (2018.01) |
| *G05B 15/02* | (2006.01) |
| *H04L 12/18* | (2006.01) |
| *H04L 12/437* | (2006.01) |

(Continued)

(52) U.S. Cl.
CPC ............ *H04L 12/437* (2013.01); *F24F 11/58* (2018.01); *F24F 11/63* (2018.01); *G05B 15/02* (2013.01); *H04L 12/18* (2013.01); *H04L 41/12* (2013.01); *H04L 49/351* (2013.01)

(58) Field of Classification Search
CPC ...................................................... H04L 41/12
See application file for complete search history.

(56) References Cited

U.S. PATENT DOCUMENTS 5,319,633 A * 6/1994 Geyer ..................... H04L 12/42
340/9.1
5,850,397 A * 12/1998 Raab ....................... H04L 45/04
370/392

(Continued)

OTHER PUBLICATIONS

U.S. Appl. No. 16/246,396, filed Jan. 11, 2019.
U.S. Appl. No. 16/296,004, filed Mar. 7, 2019.

*Primary Examiner* — Nick Corsaro
(74) *Attorney, Agent, or Firm* — Foley & Lardner LLP

(57) ABSTRACT

A method for determining a topology of an Ethernet ring having a plurality of devices includes disabling a first port of a first device of the plurality of devices, detecting a terminated link at a first port of a second device of the plurality of devices, sending a message to a ring topology generator indicating that the first port of the second device is connected to a previous device relative to the second device, and generating the topology of the Ethernet ring based on (1) the message indicating that the first port of the second device is connected to the previous device relative to the second device and (2) an indication that the first device is the previous device relative to the second device.

20 Claims, 19 Drawing Sheets

Related U.S. Application Data which is an application for the reissue of Pat. No. 10,116,517.

(51) Int. Cl.
*H04L 41/12* (2022.01)
*H04L 49/351* (2022.01)

(56) References Cited

U.S. PATENT DOCUMENTS

| | | |
|---|---|---|
| 8,244,838 B2 | 8/2012 | Balasubramanian et al. |
| 8,520,508 B2 | 8/2013 | Zinjuvadia et al. |
| 9,037,748 B2 | 5/2015 | Nguyen et al. |
| 9,413,552 B2 | 8/2016 | Forguites et al. |
| 9,450,808 B2 | 9/2016 | Lee et al. |
| 9,537,776 B2 | 1/2017 | Alsup et al. |
| 9,655,232 B2 | 5/2017 | Saxena et al. |
| 10,116,517 B1 | 10/2018 | Drury |
| 10,411,984 B2 | 9/2019 | Hoglund |
| 2005/0076140 A1 | 4/2005 | Fung |
| 2005/0243739 A1* | 11/2005 | Anderson ............... H04L 61/35 370/254 |
| 2008/0056281 A1 | 3/2008 | Denecheau et al. |
| 2008/0219174 A1* | 9/2008 | Ribeiro ................... H04L 41/12 370/242 |
| 2008/0239970 A1 | 10/2008 | Lu et al. |
| 2010/0165883 A1* | 7/2010 | Holness ................. H04L 45/28 370/255 |
| 2011/0019536 A1 | 1/2011 | Kim et al. |
| 2011/0093579 A1* | 4/2011 | Koizumi ................. H04L 41/12 709/223 |
| 2014/0321261 A1 | 10/2014 | Lee et al. |
| 2016/0036602 A1 | 2/2016 | Forguites et al. |
| 2017/0012694 A1 | 1/2017 | Kaku |
| 2017/0222830 A1* | 8/2017 | Yasuda ................. H04L 12/437 |
| 2019/0349218 A1 | 11/2019 | Hoglund et al. |

* cited by examiner

SYSTEMS AND METHODS FOR DETERMINING A TOPOLOGY OF AN ETHERNET RING OF DEVICES IN A BUILDING MANAGEMENT SYSTEM

CROSS-REFERENCE TO RELATED PATENT APPLICATIONS

This application is a continuation-in-part of U.S. patent application Ser. No. 16/206,614 filed Nov. 30, 2018, which is an application for reissue of U.S. Pat. No. 10,116,517 filed May 1, 2017, both of which are incorporated by reference herein in their entireties.

BACKGROUND

The present disclosure relates generally to building management systems. The present disclosure relates more particularly to systems and methods for identifying faults in a building management system Ethernet ring network, such as device faults, cabling faults, and/or cabling errors.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout this disclosure, such devices are referred to as BMS devices or building equipment.

In some BMS systems, at least some of the devices are connected in a network and particularly, in an Ethernet network. In many system, the Ethernet network may be configured in a ring topology such as a ring using a Media Redundancy Protocol (MRP) ring protocol. MRP rings can provide for single fault tolerances such that connectivity within the ring can be broken (e.g. a device fails or goes offline, or an Ethernet cable between devices is cut or disconnected) without impacting the network connectivity of the (other) devices in the ring.

While MRP rings provide a robust ring topology for a network there is currently no mechanism to accurately determine the order of the devices in the ring or how the devices are connected to each other (e.g. which switch port on a device is connected to a specific neighboring device). This data could be useful to verify that the devices in the MRP ring are connected correctly as per the system design. Further, device order and connection data can be useful in troubleshooting an MRP ring when errors or faults occur. Thus, it would be advantageous to have systems and methods that could automatically determine an order and connection scheme of devices connected in an MRP or other Ethernet ring topology.

SUMMARY

One implementation of the present disclosure is a method for determining a topology of an Ethernet ring having a plurality of devices. The method includes disabling a first port of a first device of the plurality of devices, detecting a terminated link at a first port of a second device of the plurality of devices, and sending a message to a ring topology generator in response to detecting the terminated link at the first port of the second device. In some embodiments, the message is sent to the ring topology generator after the first port of the second device transitions back to an active or unterminated state. The message indicates that the first port of the second device is connected to a previous device relative to the second device. The method includes generating, by the ring topology generator, the topology of the Ethernet ring based on (1) the message indicating that the first port of the second device is connected to the previous device relative to the second device and (2) an indication that the first device is the previous device relative to the second device.

In some embodiments, the topology indicates that the first port of the first device is connected to the first port of the second device.

In some embodiments, the method further includes disabling a second port of the second device, detecting a terminated link at a first port of a third device of the plurality of devices, and sending a message to the ring topology generator in response to detecting the terminated link at the first port of the third device. The message may indicate that the first port of the third device is connected to a previous device relative to the third device. The method may further include updating, by the ring topology generator, the topology of the Ethernet ring based on (1) the message indicating that the first port of the third device is connected to the previous device relative to the third device and (2) an indication that the second device is the previous device relative to the third device. In some embodiments, the indication that the second device is the previous device relative to the third device is determined ring topology generator based on the order in which messages are received from the devices in the ring. Based on the order and contents of the messages from the devices, the ring topology generator may also determine that the second port of the second device is connected to the first port of the third device.

In some embodiments, the method further includes broadcasting a device discovery command from the ring topology generator to the plurality of devices, receiving device discovery information from one or more of the plurality of devices, and determining a state of the Ethernet ring based on the received device discovery information.

In some embodiments, the method further includes broadcasting a ring state request from the ring topology generator to the plurality of devices and receiving a ring state response from one or more of the plurality of devices. The ring state response may include an indication of the state of the Ethernet ring. In some embodiments, these broadcasting and receiving steps are performed to determine the state of the Ethernet ring after the topology of the Ethernet ring has been determined.

In some embodiments, the method further includes performing a ring status query procedure including broadcasting a ring state request onto one or more of the plurality of devices, receiving a ring state confirmation from the one or more devices and receiving one or more ring state notifications from the one or more devices. The ring state notifications may provide an indication that the state of the Ethernet ring has changed. In some embodiments, these broadcasting and receiving steps are performed to determine the state of the Ethernet ring after the topology of the Ethernet ring has been determined.

In some embodiments, the method further includes, upon receiving an indication that the Ethernet ring is in an open state, utilizing the topology of the Ethernet ring to determine a device failure or a link breakage causing the Ethernet ring to be in the open state. In some embodiments, the indication that the Ethernet ring is in an open state is received after the topology of the Ethernet ring has been determined and the topology of the Ethernet ring is used to identify where a device failure or link breakage exists within the Ethernet ring.

Another implementation of the present disclosure is a system for determining a topology of an Ethernet ring. The system includes a plurality of devices configured in the Ethernet ring and a ring topology generator. The ring topology generator is configured to cause a first device of the plurality of devices to disable a first port of the first device, receive a message indicating that a first port of a second device of the plurality of devices is connected to a previous device relative to the second device in response to the second device detecting a terminated link at the first port of the second device and generate the topology of the Ethernet ring based on (1) the message indicating that the first port of the second device is connected to the previous device relative to the second device and (2) an indication that the first device is the previous device relative to the second device. In some embodiments, the indication that the first device is the previous device relative to the second device is determined by the ring topology generator based on the order in which messages are received from the devices in the ring after completion of the ring order discovery sequence.

In some embodiments, the topology indicates that the first port of the first device is connected to the first port of the second device. The ring topology generator may determine that the first port of the first device is connected to the first port of the second device based on the order of the messages and/or the contents of the messages received from the devices in the example outlined above.

In some embodiments, the second device is configured to disable a second port of the second device after the terminated link at the first port of the second device is restored. The ring topology generator may be configured to receive a message indicating that a first port of a third device of the plurality of devices is connected to a previous device relative to the third device in response to the third device detecting a terminated link at the first port of the third device and update the topology of the Ethernet ring based on (1) the message indicating that the first port of the third device is connected to the previous device relative to the third device and (2) an indication that the second device is the previous device relative to the third device. In some embodiments, the indication that the second device is the previous device relative to the third device is determined ring topology generator based on the order in which messages are received from the devices in the ring. Based on the order and contents of the messages from the devices, the ring topology generator may also determine that the second port of the second device is connected to the first port of the third device.

In some embodiments, the ring topology generator is further configured to broadcast a device discovery command from the ring topology generator to the plurality of devices, receive device discovery information from one or more of the plurality of devices, and determine a state of the Ethernet ring and/or a presence of particular devices in the Ethernet ring based on the received device discovery information.

In some embodiments, the ring topology generator is further configured to broadcast a ring state request from the ring topology generator to the plurality of devices and receive a ring state response from one or more of the plurality of devices. The ring state response may include an indication of the state of the Ethernet ring. In some embodiments, these broadcasting and receiving steps are performed to determine the state of the Ethernet ring after the topology of the Ethernet ring has been determined.

In some embodiments, the ring topology generator is further configured to broadcast a ring state request onto one or more of the plurality of devices, receive a ring state confirmation from the one or more devices, and receive one or more ring state notifications from the one or more devices. The ring state notifications may provide an indication that the state of the Ethernet ring has changed. In some embodiments, these broadcasting and receiving steps are performed to determine the state of the Ethernet ring after the topology of the Ethernet ring has been determined.

In some embodiments, the ring topology generator is further configured to, upon receiving an indication that the Ethernet ring is in an open state, utilize the topology of the Ethernet ring to determine a device failure or a link breakage causing the Ethernet ring to be in the open state. In some embodiments, the indication that the Ethernet ring is in an open state is received after the topology of the Ethernet ring has been determined and the topology of the Ethernet ring is used to identify where a device failure or link breakage exists within the Ethernet ring.

Another implementation of the present disclosure is a method for determining a topology of devices in an Ethernet ring. The method includes discovering, via a ring topology generator, a number and identification of a plurality of devices within the Ethernet ring and initiating, via the ring topology generator, a procedure to determine the topology of the devices in the Ethernet ring. The procedure includes disabling a first port of a first device of the plurality of devices, detecting a terminated link at a first port of a second device of the plurality of devices, and sending a message to the ring topology generator in response to detecting the terminated link at the first port of the second device. In some embodiments, the terminated link is detected by the second device and the message is sent from the second device to the ring topology generator. The message indicates that the first port of the second device is connected to a previous device relative to the second device. The procedure further includes generating the topology of the Ethernet ring based on (1) the message indicating that the first port of the second device is connected to the previous device relative to the second device and (2) an indication that the first device is the previous device relative to the second device.

In some embodiments, the topology indicates that the first port of the first device is connected to the first port of the second device. The ring topology generator may determine that the first port of the first device is connected to the first port of the second device based on the order of the messages and/or the contents of the messages received from the devices in the example procedure outlined above.

In some embodiments, the procedure further includes the second device autonomously disabling a second port of the second device and sending the message to the ring topology generator in response to detecting that the terminated link at the first port of the second device has been restored. The method may further include repeating the detecting, sending, generating, and autonomously disabling steps of the procedure for each of the plurality of devices.

In some embodiments, the method further includes broadcasting a ring ordering complete message onto the Ethernet ring via the ring topology generator once each of the plurality devices discovered within the Ethernet ring has had one or more ports disabled.

In some embodiments, the method further includes broadcasting a device discovery command from the ring topology generator to the plurality of devices, receiving device discovery information from one or more of the plurality of devices, and determining a state of the Ethernet ring based on the received device discovery information.

In some embodiments, the method further includes, upon receiving an indication that the Ethernet ring is in an open state, utilizing the topology of the Ethernet ring to determine a device failure or a link breakage causing the Ethernet ring to be in the open state.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
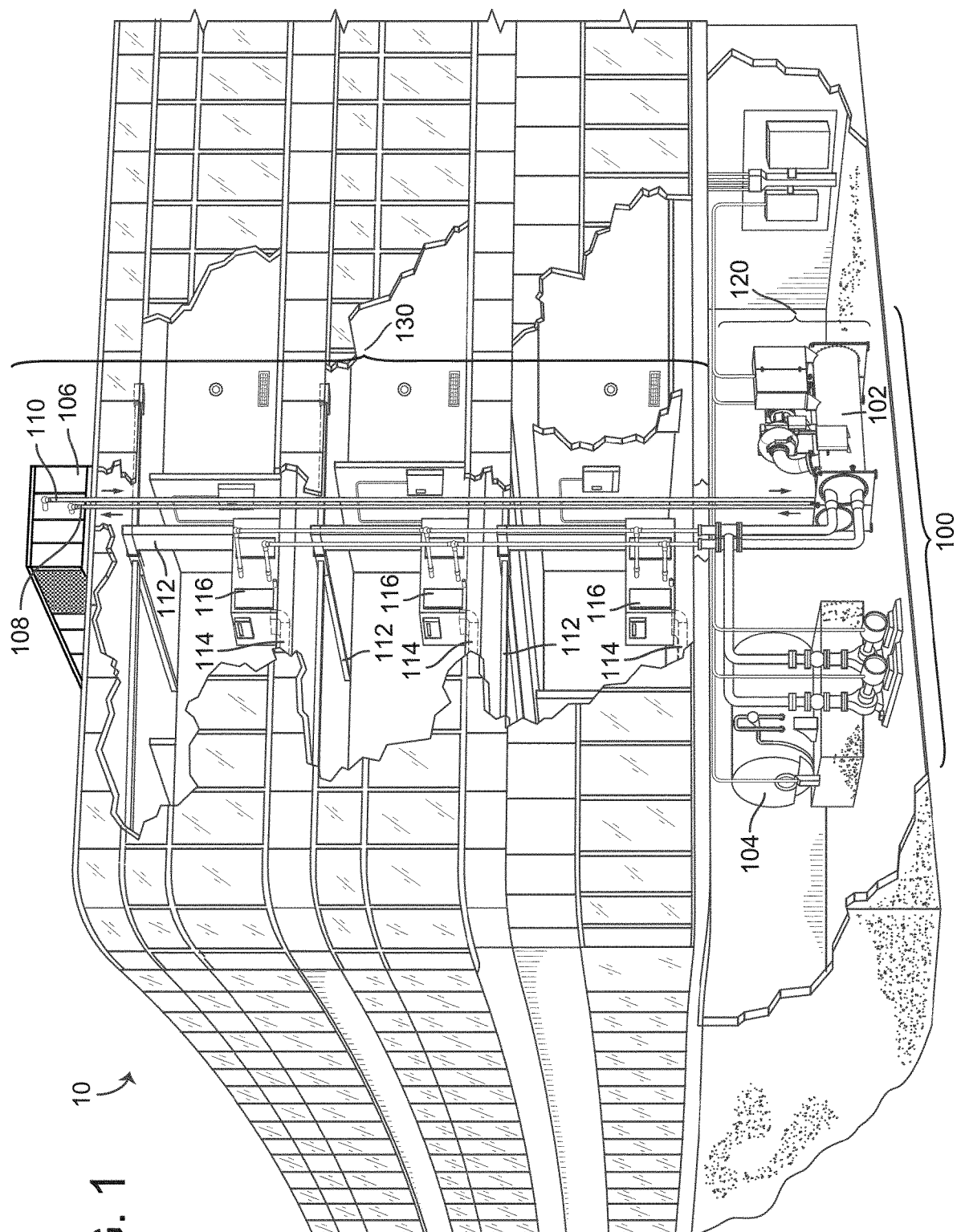
FIG. 1 is a drawing of a building equipped with a building management system (BMS) and a HVAC system, according to some embodiments.

Referring generally to the FIGURES, systems and methods for determining the topology of an Ethernet ring are shown, according to various exemplary embodiments. The systems may include an Ethernet ring topology generator (RTG), a ring supervisor, and a number of devices within the ring for which the topology is to be determined. In some embodiments, the methods described herein can leverage information made available to the ring devices by the ring management protocol in use without requiring modification of the ring management protocol itself. Previous systems and methods for determining the topology of an Ethernet ring or the like without requiring modification of the ring management protocol are described in U.S. Pat. No. 10,116, 517, filed May 1, 2017, and U.S. patent application Ser. No. 16/206,614, filed Nov. 11, 2018, both of which are incorporated by reference herein in their entirety.

In some embodiments, systems and methods described herein provide a mechanism to accurately determine the order of the devices within the ring and how the devices are connected to one another (e.g., which switch port on a device is connected to a specific neighboring device.) This topology of the ring may be generated using information made available to the ring devices by the ring management protocol in use without requiring modification to the ring management protocol itself.

In some embodiments, the topology of the ring is determined by disabling a first port of a particular device in the ring (e.g., Device A) and detecting a terminated link at a first port of another device in the ring (e.g., Device B). Device B may send a message to the RTG in response to detecting the terminated link at the first port of Device B. The message may indicate that the first port of Device B is connected to a previous device relative to Device B. The "previous device" relative to Device B can be defined as the device that most recently disabled one of its ports, causing the terminated link to be detected at Device B. In this example, Device A is the previous device relative to Device B. However, the identity of the previous device (i.e., the fact that the previous device is Device A) but does not need to be known by Device B. The message sent from Device B to the RTG may simply inform the RTG that the first port of Device B is connected to a previous device, which may be unidentified from the perspective of Device B. However, the RTG is aware that Device A is the previous device relative to Device B and can therefore determine that the first port of Device B is connected to the first port of Device A. The RTG can make this determination based on two pieces of information: (1) the message indicating that the first port of Device B is connected to the previous device relative to Device B and (2) an indication (e.g., data, information, etc.) possessed by the RTG that Device A is the previous device relative to Device B.

This process can then be repeated by disabling the second port of Device B and detecting a terminated link at a first port of yet another device (e.g., Device C). Device C may send a message to the RTG in response to detecting the terminated link at the first port of Device C. The message may indicate that the first port of Device C is connected to a previous device relative to Device C. The RTG can make this determination based on two pieces of information: (1) the message indicating that the first port of Device C is connected to the previous device relative to Device C and (2) an indication (e.g., data, information, etc.) possessed by the RTG that Device B is the previous device relative to Device C. This process can be repeated for each device in the ring until the entire topology of the ring is generated by the RTG.

It should be understood that the term "in response to" as used herein does not necessarily require an immediate action following an event, but rather only an action that is triggered by the previous event, even if the responsive action is delayed and/or other events occur between the triggering event and the responsive action. For example, the message sent from Device B to the RTG "in response to" detecting the terminated link at the first port of Device B may be sent from Device B to the RTG immediately upon detecting the terminated link at Device B or alternatively after the first port of Device B transitions back to an active or unterminated state (e.g., after re-enabling the first port of Device A). The message sent from Device B to the RTG is "in response to" detecting the terminated link at Device B in both of these scenarios, as well as any other scenario in which detecting the terminated link at Device B causes the message to be sent from Device B to the RTG, even if the message is not sent until other events occur after detecting the terminated link at Device B.

Advantageously, the methods described herein require significantly less messaging between the RTG application and the ring devices in order to generate the topology of the ring. In some embodiments, the embodiments descried herein may only require the exchange of 3+2n messages to determine the topology of the ring, where n is the number of devices within the ring. The reduction in messaging speeds up the time it takes to generate the ring topology as well as reduces the potential for a lost message, which could cause the ring topology generation process to fail.

Advantageously, the RTG application interfaces with all of the ring devices in a similar manner, and the behavior of the devices remains the same whether the ring device is a ring client or a ring manager, further simplifying the topology generation process. Additionally, the methods described herein do not require the RTG application to reside outside of the ring for which the topology is to be determined. The methods are applicable to any Ethernet ring where the associated ring management protocol makes a ring identifier and the open/closed status of the ring available to the ring devices. Further, once the topology of the ring has been generated, the topology can be used in troubleshooting an MRP ring when errors or faults occur. These and other features of the system and methods are described in greater detail below.

Building Management System and HVAC System

Referring now to FIGS. 1-4, an exemplary building management system (BMS) and a heating, ventilation, and air conditioning (HVAC) system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
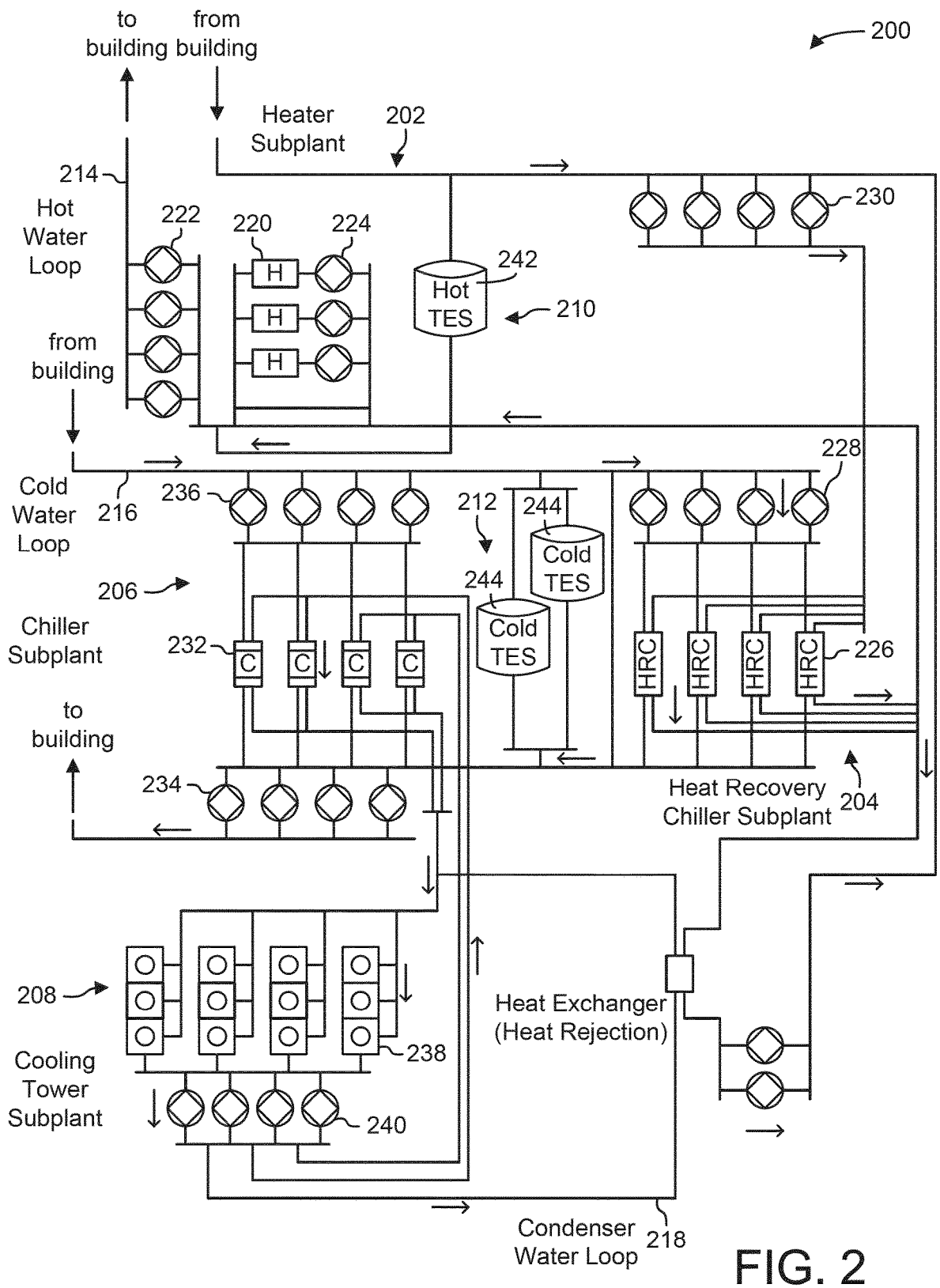
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220.

Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
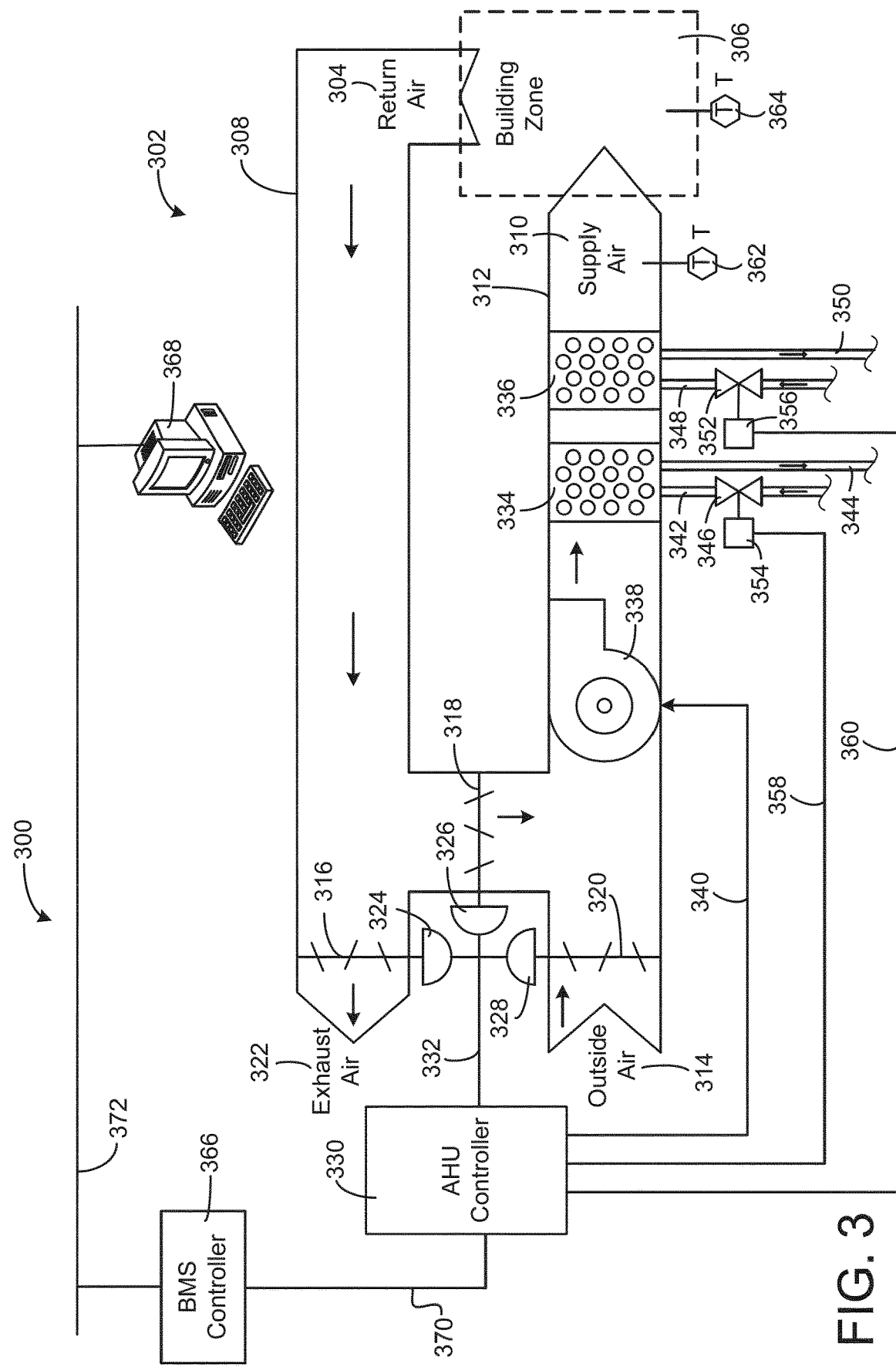
FIG. 3 is a block diagram illustrating an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
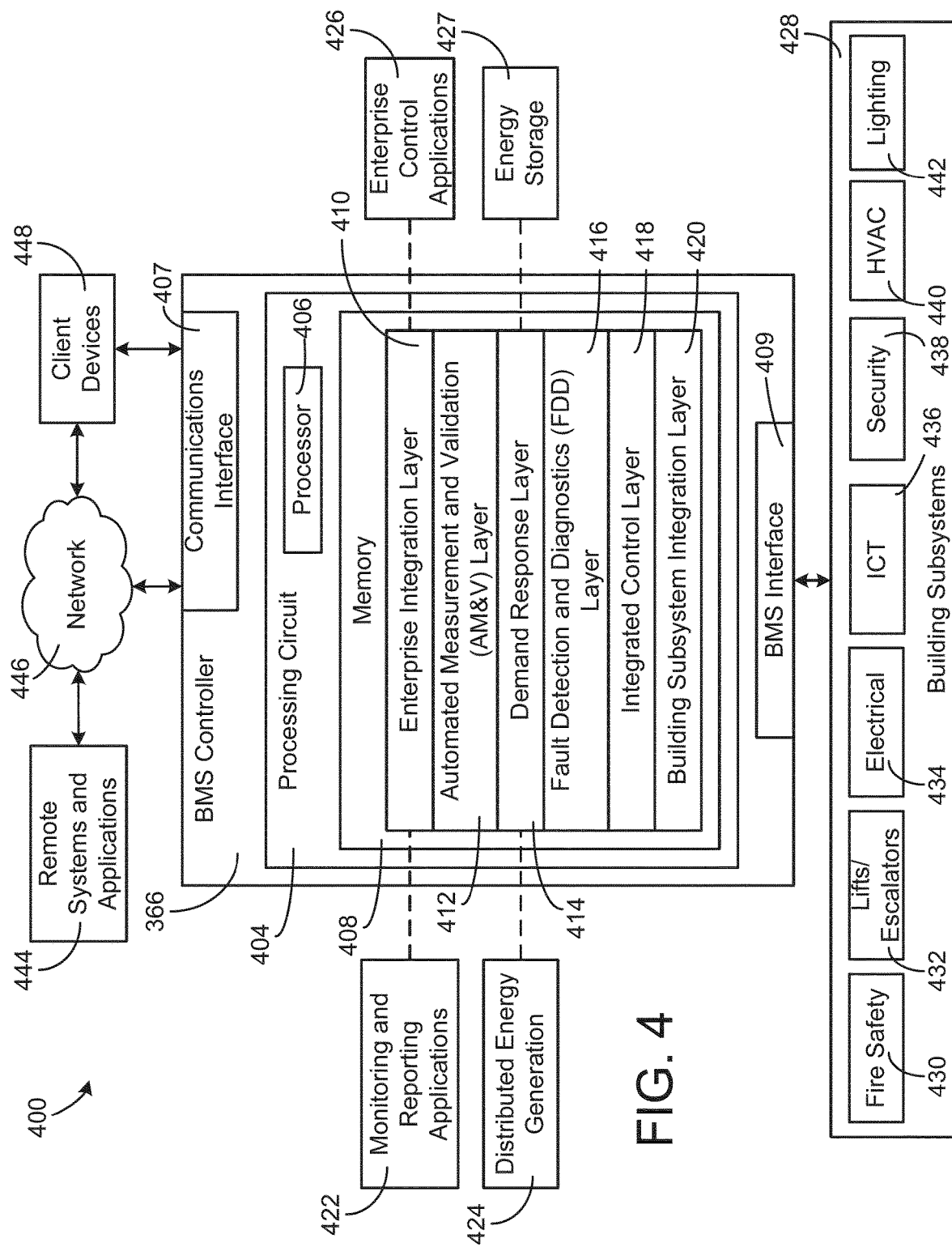
FIG. 4 is a block diagram illustrating a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/ escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Communications interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or building subsystems 428. Communications interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., locally wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, the interfaces 407, 409 can include a Wi-Fi transceiver for communicating via a wireless communications network. In another example, one or more of interfaces 407, 409 can include cellular or mobile phone communications transceivers. In one embodiment, communications interface 407 is a power line communications interface and BMS interface 409 is an Ethernet interface. In other embodiments, communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation system 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the building subsystems 428 such that the subsystems 428 behave as a single integrated supersystem. In an exemplary embodiment, integrated control layer 418 includes control logic that uses inputs and outputs from a plurality of building subsystems 428 to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or ensure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Ethernet Ring Topology Generation

The BMS, as described above, can have multiple individual components within the BMS. Example components may include control devices, such as field equipment controllers (FECs), advanced application field equipment controllers (FACs), network control engines (NCEs), input/output modules (IOMs), and variable air volume (VAV) modular assemblies. However, other control device types are contemplated. For example, the BMS may include multiple devices such as sensors, actuators, valves, beacons, switches, thermostats, etc. In some embodiments, some or many of these devices may be configured as or connected to a network and controlled through that network. For example, the network may be an Ethernet network arranged in a ring topology. The present disclosure describes a mechanism to dynamically and efficiently determine the topology of the devices within the ring, thereby allowing for the system configuration to be easily verified automatically. Further, the mechanism for determining the topology of the devices within the ring can allow for more efficient identification of a malfunctioning device within the Ethernet ring when a fault is detected.

Figure 5:
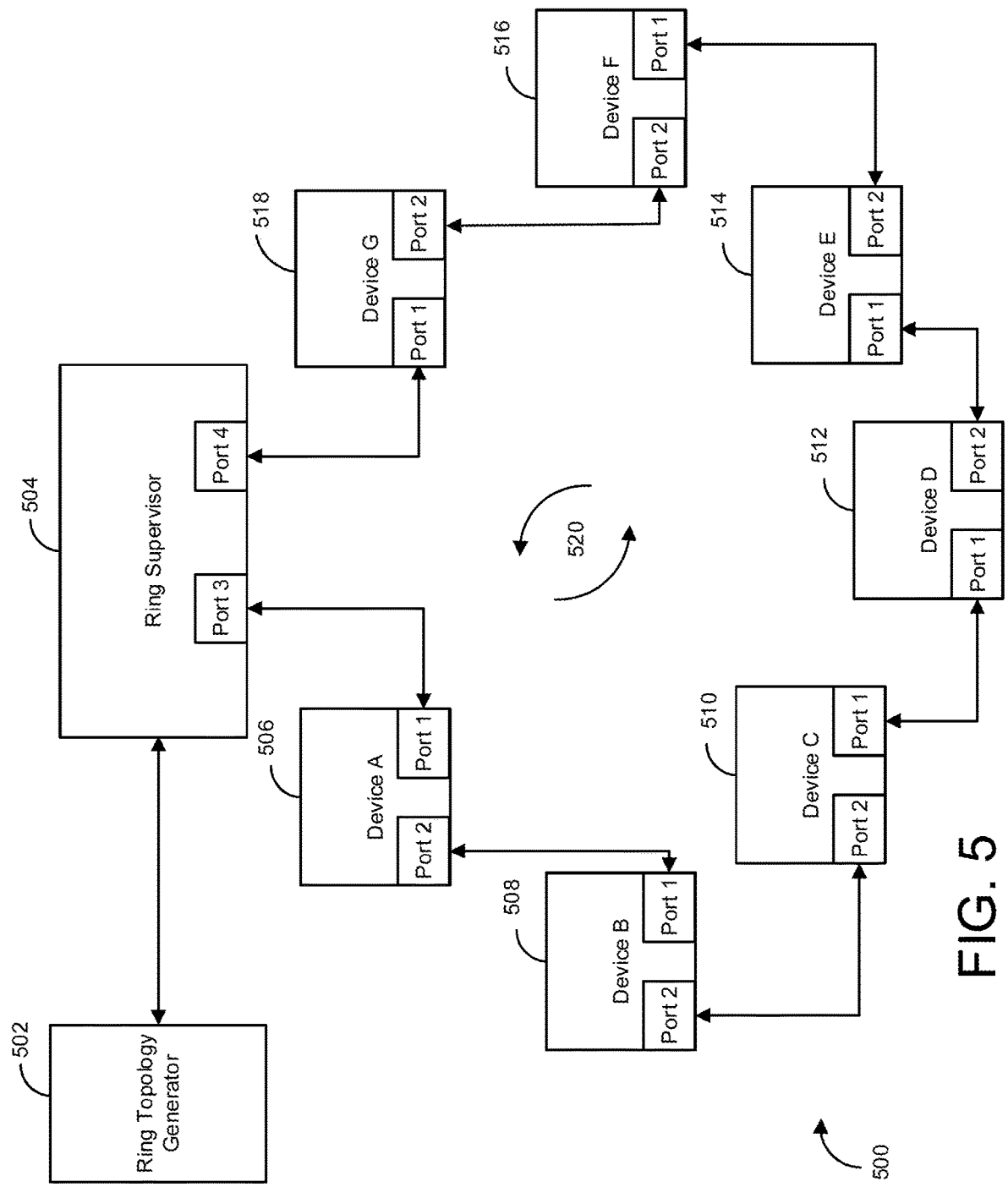
FIG. 5 is a block diagram illustrating a network connected to a plurality of devices, according to some embodiments.

Referring now to FIG. 5, a block diagram illustrating a networked system 500 is shown. The system includes an Ethernet ring topology generator (RTG) 502, a ring supervisor 504, and a number of devices 506-518. As described above, the devices 506-518 may be any type of devices within a BMS that are connected via an Ethernet connection. The RTG 502 may be a remote server, a personal computer, a laptop computer, or other device configured to operate as the topology generator. In one embodiment, the RTG 502 is a Metasys server from Johnson Controls, Inc. In some embodiments, the RTG 502 must be a device outside of an Ethernet ring in order to accurately generate the topology of the devices within the Ethernet ring. The RTG 502 is configured to transmit one or more commands to the devices 506-518 in the Ethernet ring via the ring supervisor 504. The RTG 502 may further be configured to generate and manage one or more topology tables associated with an Ethernet ring, and which may be used to determine an order and configuration of the devices 506-518 arranged in an Ethernet ring 520. In some examples, the RTG 502 may also store the topology information in lists, arrays or other data structures, as applicable. In one embodiment, to determine the topology of the devices 506-518 of the devices within the Ethernet ring 520, the RTG 502 must determine the following information: the devices in the ring, the order of the devices in the ring relative to each other; and how the devices are connected to each other (i.e., which Ethernet ports connect two devices in the ring, or which Ethernet ports of a device connects the device to the ring supervisor 504. The processes for determining the above information will be described in more detail below.

The ring supervisor 504 may be standard Ethernet switch configured to manage a number of Ethernet-based devices in ring topology. In one embodiment, the Ring supervisor 504 is configured to host a Dynamic Host Control Protocol (DHCP) server and a MRP ring manager. The ring supervisor 504 may have a number of Ethernet ports for communicating with one or more Ethernet devices or networks. In one embodiment, the ring supervisor 504 uses two ports, such as port A and port B to communicate with the devices 506-518 and generate an Ethernet ring. As stated above, the Ethernet ring 520 of system 500 may be configured as an MRP ring. However, the herein disclosed topology determination methods and systems are intended to be protocol agnostic, and could be used in various other Ethernet ring protocols, such as a spanning tree protocol (STP) rings, daisy chain configurations, and/or other Ethernet ring protocols. In an MRP ring, an MRP beacon frame may be transmitted to each of the devices 506-518 in the Ethernet ring 520 to inform the devices 506-518 that they are a member of an MRP ring. The devices 506-518, upon receiving the MRP beacon flag, flag themselves as being a part of an MRP ring. In an MRP ring, one device in the ring (e.g. the ring supervisor 504) manages the Ethernet ring 520 to prevent continuous/infinite looping of messages within the Ethernet ring 520.

Each of the devices 506-518 may include a first port and a second port. For example, device A 506 is shown to include Port 1 and Port 2. One port may be designated as a receiving port and the other port may be a forwarding port. In one example, when the ring is closed (e.g. there is no break in the connectivity in the ring), the ring supervisor 504 may block one of the ports to prevent infinite looping within the ring and forwards all packets received outside the ring to the device on the ring. However, both Port 1 and Port 2 may be capable of sending and receiving data packets, as needed. For example, for device A 506, Port 1 is shown as a receiving port, and port 2 is shown as a forwarding port. However, the ports (e.g. port 1 and port 2) may be interchanged between being a forwarding port and a receiving port based on which port on the ring supervisor 504 is being used as a forwarding port. For example, in the system 500, if Port 4 of the ring supervisor 504 is used as the forwarding port of the ring supervisor 504, then Port 2 would be the receiving port and Port 1 would be the forwarding port of device A 506. In a typical ring topology, one port of the ring supervisor 504 is set as the forwarding port to prevent redundant messages from being provided to the Ethernet ring 520.

Figure 6:
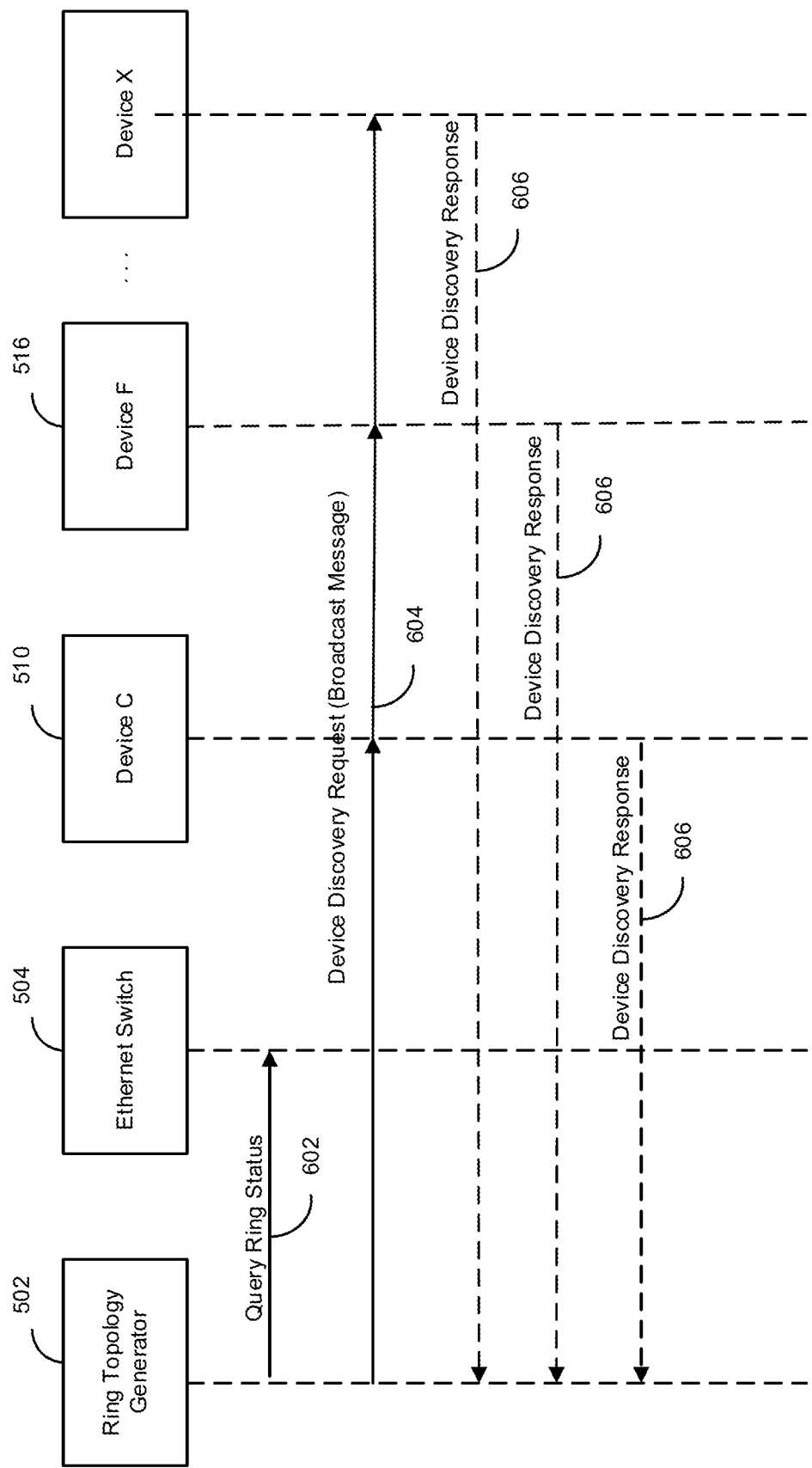
FIG. 6 is a data flow chart illustrating a process for discovering devices in an Ethernet ring, according to some embodiments.

Turning now to FIG. 6, a data flow chart illustrating a process 600 for discovering the devices in an Ethernet ring is shown, according to some embodiments. The process 600 is described in reference to the system 500 described above. However, it is contemplated that the process 600 can be used with various other Ethernet networks, as described above. As stated above, before the topology of the devices 506-518 can be determined, the RTG 502 needs to discover the devices 506-518 that are participating in the Ethernet ring 520. In some embodiments, the discovery process 600 includes discovering the devices 506-518 as well as the ring supervisor 504. More specifically, the discovery process 600 determines which ports on the ring supervisor 504 are hosting the Ethernet ring 520. In some embodiments, the RTG 502 can be pre-configured with basic information about the Ethernet ring 520. For example, the RTG 502 may be configured with the IP address of the ring supervisor 504 hosting the Ethernet ring 520, and the type of ring (MRP, STP, etc.) being used. This information can be used to determine which ring supervisor 504 commands need to be issued to obtain a status of the Ethernet ring 520. Additionally, the RTG 502 may know the switch ports of the ring supervisor 504 used to operate the ring Ethernet 520, and a subnetwork of the devices in the Ethernet ring 520. In some embodiments, a user may provide this information to the RTG 502. In other embodiments, the RTG may interrogate the Ring supervisor 504 to obtain the necessary information.

The RTG 502 first transmits a ring status query 602 to determine if the Ethernet ring 520 is open or closed. If the ring is closed, the RTG 502 determines that all devices 506-518 are reachable and broadcasts a device discovery broadcast message 604. Upon receiving the device discovery broadcast message 604, the devices 506-518 respond by transmitting a device discovery response 606. The device discovery response 606 may include a device ID, and a device IP address.

Upon receiving a device discovery response 606 from each of the devices 506-518, the RTG 502 may create a ring topology data structure and populate the data structure with the information within the received device discovery responses 606. In one embodiment, the data structure is a Ring Topology Table, such as Table 1, shown below.

TABLE 1

| Ring Topology Table with Device Discovery Response Data Ring Topology Table | | | |
|---|---|---|---|
| Ethernet Supervisor Port/Ring Device ID | Port to Previous Ring Device | Port To Next Ring Device | Ring Order Count |
| Supervisor Ring Port | N/A | | N/A |
| Device C | | | |
| Device F | | | |

TABLE 1-continued

| Ring Topology Table with Device Discovery Response Data Ring Topology Table | | | |
|---|---|---|---|
| Ethernet Supervisor Port/Ring Device ID | Port to Previous Ring Device | Port To Next Ring Device | Ring Order Count |
| Device B | | | |
| Device G | | | |
| Device D | | | |
| Device A | | | |
| Device E | | | |
| Supervisor Ring Port | | N/A | N/A |

Figure 7:
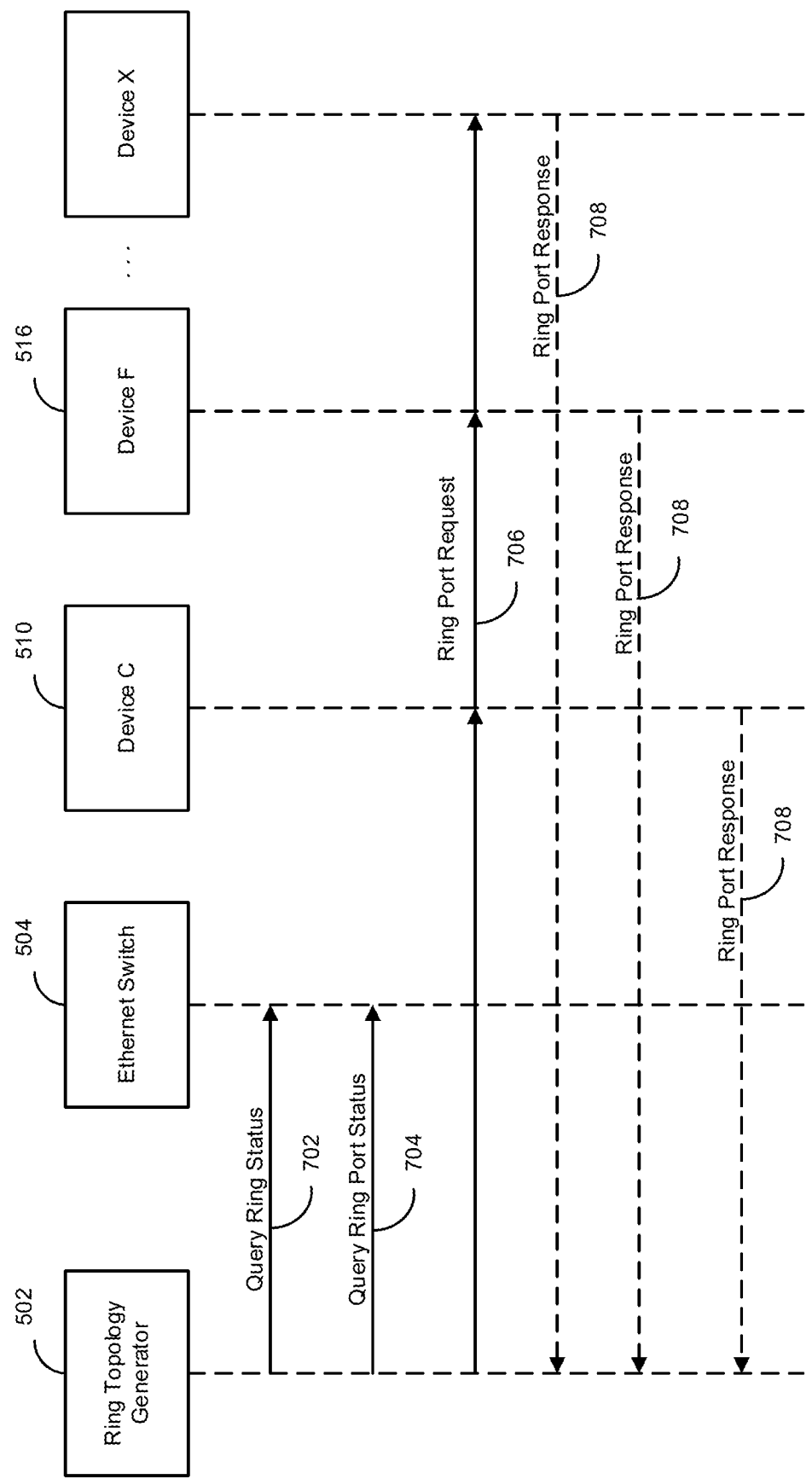
FIG. 7 is a data flow chart illustrating an Ethernet port orientation process, according to some embodiments.

After the devices 506-518 of the Ethernet ring are discovered, the RTG 502 initiates an Ethernet port orientation process 700, as shown in FIG. 7 to orient the ports of the devices 506-518 relative to each other. In one embodiment, the RTG 502 orients each device's 506-518 ports relative to the ring supervisor's 504 forwarding ring port. In order to prevent infinite looping when the ring is closed, the ring supervisor 504 may block one of its ring ports (Port 3 or Port 4) such that data from outside the Ethernet ring 520 is always routed into the Ethernet ring 520 through the other ring port (the forwarding port). Therefore, all of the device 506-518 will receive messages on their data port which is closest to the ring supervisor's 504 forwarding port.

In one embodiment, the RTG 502 first transmits a ring status query 702 to the ring supervisor 504 to determine if the Ethernet ring 520 is open or closed. If the ring is open, the RTG 502 may abort the Ethernet port orientation process 700. If the ring is closed, the RTG 502 may transmit a ring port status query 704 to the ring supervisor 504 to determine which port is currently configured as the forwarding port of the ring supervisor 504, and therefore which port of the ring supervisor 504 is blocked. In one embodiment, the ring status query 702 and the ring port status query 704 may be combined into a single query. For purposes of this example, the forwarding port is determined to be Port 3, and the blocked port is determined to be Port 4.

The RTG 502 may then broadcast a ring port request message 706 to all of the devices 506-518. The devices 506-518 may then respond back to the RTG 502 with a ring port response message 708 containing their Device ID, and the port on which they received the ring port request message (e.g. port 1 or port 2). In one example, messages from the RTG 502 will be received on the Ethernet port closest to the forwarding port of the ring supervisor 504 for each of the devices 506-518 where the Ethernet ring 520 is closed. The port receiving the ring port request message 706 therefore is either directly connected to the forwarding port of the ring supervisor 504 (port 3), or is connected to the previous device 506-518 in the ring relative to the forwarding port of the ring supervisor 504 (port 3). Therefore, the device's 506-518 other port is therefore connected to either the blocked port of the ring supervisor 504 (port 4) or to the next device 506-518 in the Ethernet ring 520, according to some embodiments.

The RTG 502 may then update the Ring Topology table with the data received in the ring port response messages 708 received from the devices 506-518. In one embodiment, the RTG 502 may populate the Port to Previous Ring Device with the Ethernet port (1 or 2) of each device 506-518 based on the data received in the ring port response message 708. The Port to Previous Ring Device data points indicate which port of a given device 506-518 is closest to the ring supervisor's 504 forwarding port. The RTG 502 may also populate the Port to Next Ring Device with the Ethernet port (1 or 2) of each device 506-518 based on the data received in the ring port response message 708. The Port to Next Ring Device data points indicate which port of a device 506-518 is closest to the Ethernet ring's 520 blocked port (port 4). An example updated Ring Topology Table is shown in Table 2 below.

TABLE 2

Ring Topology Table with Device Port Data
Ring Topology Table

| Ethernet Supervisor Port/Ring Device ID | Port to Previous Ring Device | Port To Next Ring Device | Ring Order Count |
|---|---|---|---|
| Supervisor Ring Port | N/A | 3 | N/A |
| Device C | 2 | 1 | 0 |
| Device F | 1 | 2 | 0 |
| Device B | 1 | 2 | 0 |
| Device G | 2 | 1 | 0 |
| Device D | 1 | 2 | 0 |
| Device A | 1 | 2 | 0 |
| Device E | 1 | 2 | 0 |
| Supervisor Ring Port | 4 | N/A | N/A |

Figure 8:
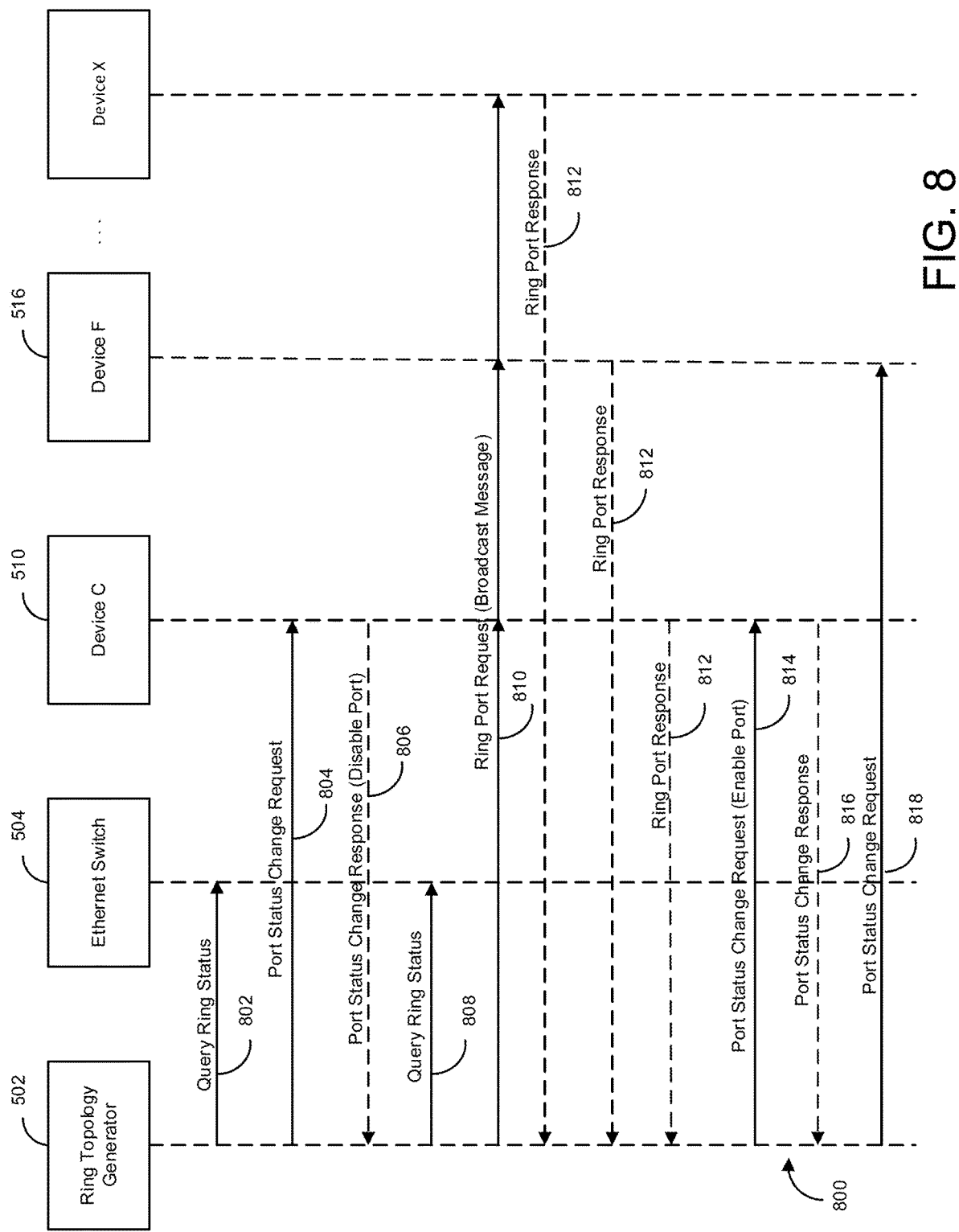
FIG. 8 is a data flow chart illustrating a diagnostic flow to establish that the Ethernet network of FIG. 5 is in a closed status, according to some embodiments.

Once the RTG 502 has determined the orientation of each of the devices' 506-518 ports relative to the ring supervisor 504, the RTG 502 can determine an order of the devices in the ring relative to the ring supervisor's 504 forwarding port. Turning now to FIG. 8, a data flow chart illustrating a process 800 for determining a position of devices in an Ethernet ring is shown, according to some embodiments. The RTG 502 first transmits a ring status query 802 to the ring supervisor 504 to determine if the Ethernet ring 520 is open or closed. If the Ethernet ring 520 is determined to be open, the RTG 502 aborts the process 800. If the Ethernet ring 520 is determined to be closed, the RTG 502 then sends a port status change request message 804 to a first device 506-518 of the Ethernet ring 520. In some embodiments, the RTG 502 may transmit the port status change request message 804 to the device which is listed first in the generated ring topology table. However, in other embodiments, the RTG 502 may transmit the port status change request message to a device based on other criteria.

In one embodiment, the port status change request message 804 includes a command to disable one ports of the device 506-518 receiving the message 804. In one embodiment, the port status change request message 804 instructs the device 506-518 receiving the message 804 to disable the port associated with the port to next ring device parameter in the ring topology table for the associated device 506-518. As shown in FIG. 8, device C 510 may be the first device to receive the port status change request message 804. In some embodiments, the device 506-518 currently receiving the port status change request message 804 is referred to as the reference device. After the device C 510 disables a port, the device C 510 may transmit a port status change request message 806 to the RTG 502 indicating that the port has been disabled. Upon receiving the port status change request message 806, the RTG 502 again transmits a ring status query 808 to the ring supervisor 504 to verify that the ring is now open. Upon verifying that the ring is open, the RTG 502 broadcasts a ring port request message 810 to devices 506-518 via the forwarding port of the ring supervisor 504. Each device 506-518 receiving the ring port request message 810 may transmit a ring port response message 812 to the RTG 502.

Upon receiving the ring port response messages 812, the RTG 502 first determines if the ring port response message 812 is from the reference device (e.g. the device with the currently disabled port). If the ring port response message 812 is from the reference device, the RTG 502 ignores the ring port response message 812. For the ring port response messages 812 not from the reference device, the RTG 502 then determines if the ring port response message for each of the other non-reference devices 506-518 is received from the Ethernet port which matches the Port to Previous Ring Device parameter for each associated device in the ring topology table. If the ring port response message 812 is not from the reference device, and the Ethernet port from which the ring port response message 812 was received matches the port to previous ring device parameter within the ring topology table, the RTG 502 increments a ring order count parameter in the ring topology table for the associated device. As only the forwarding port of the ring supervisor 504 is active, the RTG 502 will only receive the ring port response messages from device 506-518 between the forwarding port of the ring supervisor 504 and the reference device. At this point the ring is open such that the ring supervisor 504 can send the ring port request message 810 over both its ring ports (e.g. port 1 and port 2). However, only the devices which receive the ring port request message 810 via the previously defined forwarding port (i.e., The Port to Previous Ring Device port) will have their Ring Order Count incremented. Thus, as in the above example where the device C is the initial reference device, after all of the ring port response messages 812 have been received, the ring order count parameters values within the ring topology chart will be as shown in Table 3, below.

TABLE 3

Ring Topology Table with Initial Ring Order Count
Ring Topology Table

| Ethernet Supervisor Port/Ring Device ID | Port to Previous Ring Device | Port To Next Ring Device | Ring Order Count |
|---|---|---|---|
| Supervisor Ring Port | N/A | 3 | N/A |
| Device C | 2 | 1 | 0 |
| Device F | 1 | 2 | 0 |
| Device B | 1 | 2 | 1 |
| Device G | 2 | 1 | 0 |
| Device D | 1 | 2 | 0 |
| Device A | 1 | 2 | 1 |
| Device E | 1 | 2 | 0 |
| Supervisor Ring Port | 4 | N/A | N/A |

Once the ring port response messages 812 have been received, the RTG 502 may transmit a port status change request 814 to the reference device, device C 510. The port status change request 814 can instruct the reference device, device C 510 to re-enable its Ethernet port. The reference device, device C 510, can then transmit a port status change response 816 to the RTG 502 indicating that the port has been re-enabled. The port status change response 816 may include a message ID indicating that the message is a port status change response, an Ethernet port that was updated, and a result bit associated with the updated Ethernet port (e.g. 1-port enable, 2-port disabled). Upon receiving the port status change response 816, the RTG 502 may transmit a port status change request 818 to a subsequent device 506-518 in the ring that is different from the previous reference device. After receiving confirmation that the device's Ethernet port has transitioned back to enabled, the RTG 502 may perform another Query Ring Status to confirm that the ring is now closed, and prior to moving on to the next device with 818. The RTG 502 may then repeat the above process for the new reference device, and continue until each of the previously discovered devices 506-518 have been designated as the reference device (e.g. had a port disabled). Upon completion of the process 800, the ring topology table may include the following data as shown in Table 4 below, based on the system 500.

TABLE 4

Ring Topology Table Including Complete Ring Order Count Data
Ring Topology Table

| Ethernet Supervisor Port/Ring Device ID | Port to Previous Ring Device | Port To Next Ring Device | Ring Order Count |
| --- | --- | --- | --- |
| Supervisor Ring Port | N/A | 3 | N/A |
| Device C | 2 | 1 | 4 |
| Device F | 1 | 2 | 1 |
| Device B | 1 | 2 | 5 |
| Device G | 2 | 1 | 0 |
| Device D | 1 | 2 | 3 |
| Device A | 1 | 2 | 6 |
| Device E | 1 | 2 | 2 |
| Supervisor Ring Port | 4 | N/A | N/A |

The RTG 502 may then order then devices 506-518 based on their respective ring order count. By ordering the devices 506-518 from highest ring order count to lowest ring order count, the devices 506-518 will be listed in the order they are installed in the ring in relation to the forwarding port of the ring supervisor 504, as well as how the device 506-518 in the ring are connected to each other (e.g., the Port to Previous Ring Device for the first device in the ring topology table is connected to the ring manager forwarding port, the Port to Next Ring Device of the first device in the ring topology table is connected to the Port to Previous Ring Device of the second device in the ring topology table, and so on). For the system 500 of FIG. 5, the ordered ring topology table is shown below in Table 5.

TABLE 5

Ordered Ring Topology Table
Ring Topology Table

| Ethernet Supervisor Port/Ring Device ID | Port to Previous Ring Device | Port To Next Ring Device | Ring Order Count |
| --- | --- | --- | --- |
| Supervisor Ring Port | N/A | 3 | N/A |
| Device C | 2 | 1 | 4 |
| Device F | 1 | 2 | 1 |
| Device B | 1 | 2 | 5 |
| Device G | 2 | 1 | 0 |
| Device D | 1 | 2 | 3 |
| Device A | 1 | 2 | 6 |
| Device E | 1 | 2 | 2 |
| Supervisor Ring Port | 4 | N/A | N/A |

Figure 9:
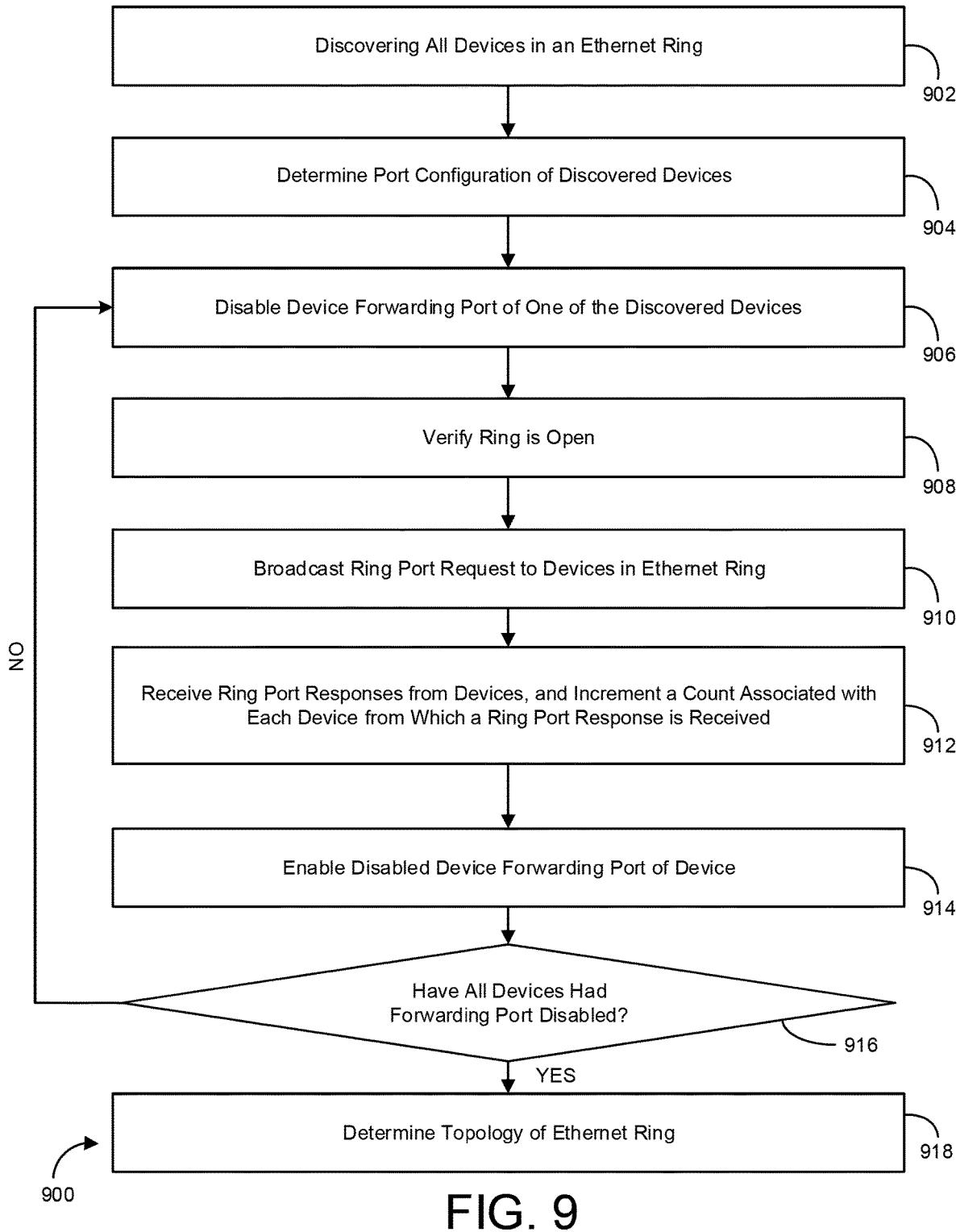
FIG. 9 is a flow diagram illustrating a process for determining a topology of an Ethernet ring, according to some embodiments.

Turning now to FIG. 9, a flow diagram illustrating a process 900 for determining a topology of an Ethernet ring is shown, according to some embodiments. The process 900 may be a combination of the processes 600, 700 and 800 described above. In one embodiment, the process 900 operates at the application layer, allowing the topology of the Ethernet ring 520 to be determined by communicating directly with the devices in the Ethernet ring, rather than relying on messaging type specific to the ring protocol to provide the topology information. In some embodiments, an RTG, such as RTG 502 described above, may be responsible for performing the various steps of the process 900. In one example, the RTG may interface with a user, such as via a graphical user interface (GUI), to allow a user to both configure the RTG, but also to present the user with a graphical representation of the generated ring topology, in some embodiments. In one embodiment, when the RTG is initialized or launched, the RTG will initially generate the topology of the configured Ethernet ring as described below. Further, the RTG may continue to monitor the status of the ring to determine if/when the topology needs to be re-generated. For example, the RTG may regenerate the ring topology whenever the ring status transitions from open to closed to account for the addition/deletion of devices to the Ethernet ring as well as any cabling changes within the Ethernet ring (e.g. if the cables going into a particular device's Ethernet ports were swapped.)

At process block 902, all the devices within the Ethernet ring are discovered. In one embodiment, an RTG, such as RTG 502 may execute a process to discover all of the devices within the Ethernet ring. For example, the RTG may use a process such as process 600 described above to discover all the devices in the Ethernet ring. The RTG may also determine other information about the devices, such as IP addresses of the devices, device types, associated other devices, associated sub-networks, or the like.

At process block 904, the RTG may determine a port configuration of the discovered devices. In some embodiments, the RTG may determine the port configurations using a process similar to process 700 described above. For example, the RTG may broadcast a ring port request to the devices on the Ethernet ring. In some embodiments, the RTG first ensures that one of the ports of an Ethernet ring supervisor associated with the Ethernet ring is disabled, ensuring that any message broadcasted by the RTG is only provided to the Ethernet ring via a single port. However, it should be understood that the step of disabling one of the ports of the Ethernet ring supervisor is optional and can be omitted in other embodiments. By determining the port configurations of the discovered devices, the RTG can determine a relationship of the Ethernet ports of the devices in regards to each other, and an Ethernet ring supervisor, such as ring supervisor 504. The RTG may then populate a data structure with the individual devices within the Ethernet ring, as well as the relationships of their individual ports. For example, the RTG may populate the data structure with data such as the "port to previous ring device," indicating which port the device received the broadcasted message from the RTG.

At process block 906, the RTG may transmit an instruction to a first device within the Ethernet ring and instruct the first device to disable one of the Ethernet ports of the device. The device with the disabled port may be referred to as the reference device. The RTG may then determine if the Ethernet ring is open at process block 908. In some embodiments, the RTG may verify that the Ethernet ring is open by querying the Ethernet ring supervisor, which can provide a status of the Ethernet ring (e.g. whether the Ethernet ring is open or closed). In other embodiments, the RTG may broadcast a message to the devices on the Ethernet ring and determine if a response is issued from all of the devices, or a portion of the devices, indicating whether the ring is open or closed.

Once the device determines that the Ethernet ring is open, the RTG broadcasts a ring port request to the devices in the Ethernet ring at process block 910. The ring port request may include a message ID indicating that the message is a ring port request. The ring port request may be a standard request in Ethernet ring configurations. At process block 912, the devices receiving the ring port request transmit a ring port response to the RTG. The ring port response may include a message ID, a device ID of the device transmitting the ring port response, a result and an Ethernet port message. The device ID may be a unique identifier for the device. For example, the device ID may be a BACnet OID, a logical name, a media access control (MAC) address, or some other existing ID. The result message may indicate whether the ring port response is successful or unsuccessful. Finally, the Ethernet port message may indicate on which port of the device the ring port request message was received. In one embodiment, the Ethernet port message may only be included in the ring port response where the result message indicates that the ring port response was successful. The RTG, having received the ring port responses from each of the devices receiving the ring port request increments a count associated with each device from which the ring port response is received. In one embodiment, the RTG may ignore the ring port response received from the reference device (e.g., the device with the disabled port).

Once all of the ring port responses have been received, the RTG enables the previously disabled port on the reference device at process block 914. The RTG may further query the ring supervisor to confirm the ring is closed. The RTG then determines if all of the previously discovered devices within the Ethernet ring have had a port disabled (e.g., has each device been the reference device) at process block 916. If the RTG determines that not all of the previous devices have had an Ethernet port disabled, the process 900 returns to process block 906. If the RTG does determine that all of the devices have had their Ethernet ports disabled, the RTG may determine a topology of the Ethernet ring (e.g. determine the order of the discovered devices within the ring) at process block 918. In one embodiment, the RTG may determine the topology of the devices in the Ethernet ring by ordering the devices based on the number of ring port responses received from each device. The RTG may then determine that the device with the highest number of associated port responses is the device closest to the forwarding port (e.g. active port) of the Ethernet ring supervisor). Therefore, the device with the lowest number of associated port responses is the device further away from the forwarding port of the Ethernet ring supervisory. Accordingly, the order of the devices, based on the number of received port responses, will correspond to the position of the device within the Ethernet ring with respect to the forwarding port of the Ethernet ring supervisor.

In an additional exemplary embodiment, the present disclosure describes a mechanism to dynamically and efficiently determine the topology of the devices within the ring, thereby allowing for the system configuration to be easily verified automatically, without requiring any interaction with the ring supervisor 504. Rather, the RTG 502 is able to communicate directly with any of the devices 504-518 in order to determine the topology of the Ethernet ring 520. In order to construct the topology of ring 520, RTG 502 must determine at least the devices 504-518 which are in the ring 520, the order of the devices 504-518 in the ring 520 relative to each other, and how the devices 504-518 are connected to each other (i.e., which Ethernet ports connect devices 504-518 in the ring 520, or which Ethernet port connects a device 504-518 to the managed switch). In some embodiments, as described further below, RTG 502 may not be a separate application from the Ethernet ring 520 that resides outside of the Ethernet ring 520, but instead functions with any Ethernet ring 520 where the associated RTG 502 makes a ring identifier and the open/closed status of the Ethernet ring 520 available to the devices 504-518. Further, this additional mechanism for determining the topology of the devices within the ring can allow for more efficient identification of a malfunctioning device within the Ethernet ring when a fault is detected.

Figure 10:
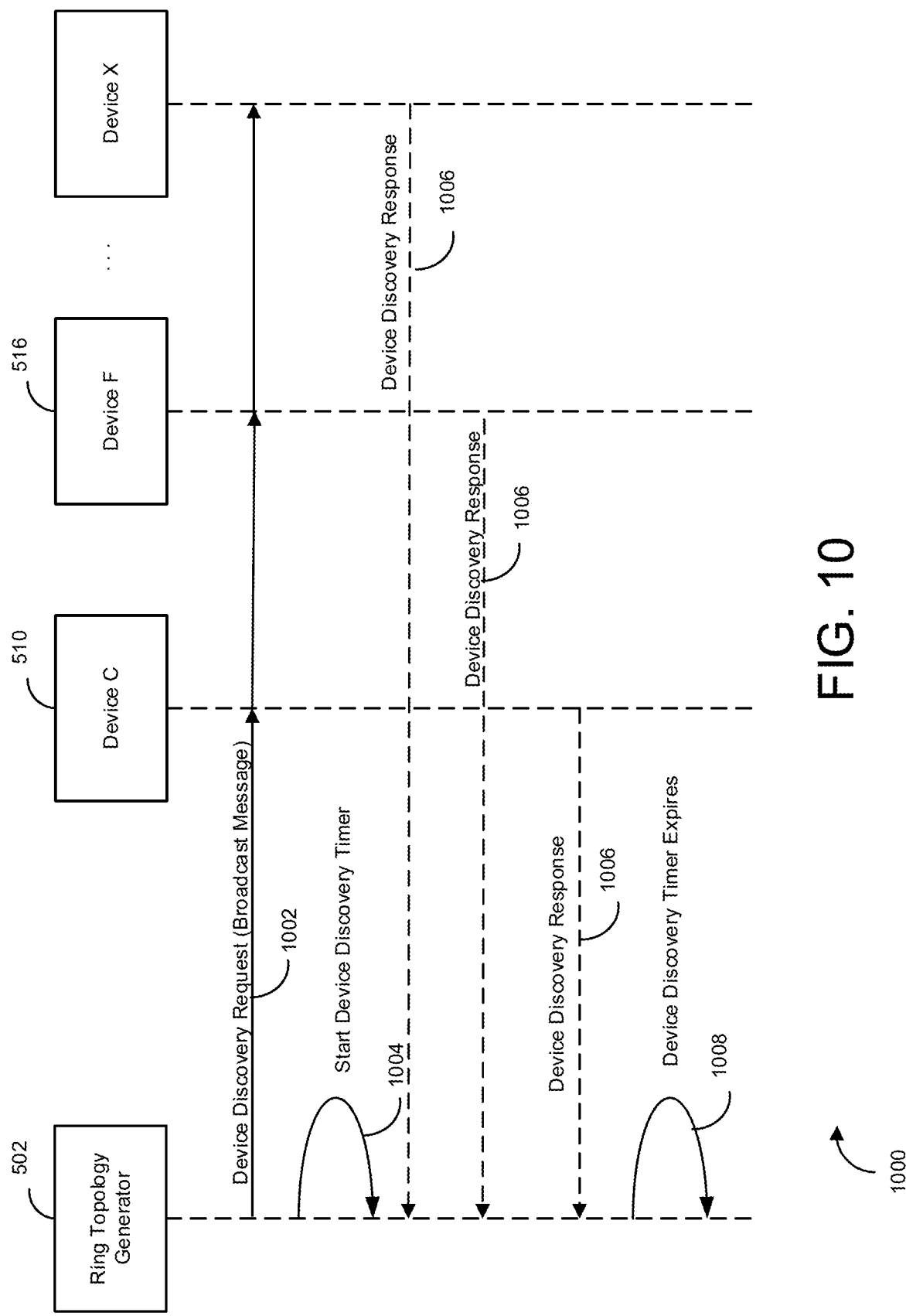
FIG. 10 is a data flow chart illustrating a process for discovering devices in an Ethernet ring, according to some embodiments.

Turning now to FIG. 10, a data flow chart illustrating an alternative process 1000 for discovering the devices in an Ethernet ring is shown, according to some embodiments. The process 1000 is described in reference to the system 500 described above, and defines an alternative mechanism for discovering the devices in an Ethernet ring that requires fewer communication between a ring topology generator application, ring devices, and a ring supervisor. However, it is contemplated that the process 1000 can be used with various other Ethernet networks, as described above. As stated above, before the topology of the devices 504-518 can be determined, the RTG 502 needs to discover the devices 504-518 that are participating in the Ethernet ring 520. In some embodiments, the RTG 502 may be pre-configured with basic information about the Ethernet ring 520. For example, the RTG 502 may be configured with the IP address of the ring supervisor 504 hosting the Ethernet ring 520, and the type of ring (MRP, STP, etc.) being used. Additionally, the RTG 502 may know the switch ports of the ring supervisor 504 used to operate the ring 520, and a subnetwork of the devices in the Ethernet ring 520. In some embodiments, a user may provide this information to the RTG 502. In other embodiments, the RTG may interrogate the Ring supervisor 504 to obtain the necessary information.

The device discovery process 1000 is initiated by the RTG 502 to discover the devices 504-518 in the Ethernet ring 520. In some embodiments, the discovery process 1000 includes discovering the devices 506-518. In order to successfully discover each and every one of the devices 504-518 within the ring 520, the ring must be closed during the device discovery process 1000. If ring 520 is not closed, each and every device 506518 may not respond to the process 1000, as they may be unreachable if there are two or more breaks in the ring 520. To start the device discovery process 1000, the RTG 502 first transmits a device discovery request 1002 to discover the devices 504-518 within the ring. In some embodiments, the device discovery request 1002 may comprise a message ID, which may be set to 1 as this is the first message sent to determine ring topology, and a ring ID, which identifies the ring 520. In other embodiments, the message ID may be set to any other value that will provide a unique message identifier to the receiver, while the specific value of the message ID is not important. If the ring 520 is an MRP ring, the ring ID is set to the MRP domain ID of the ring 520 for which the topology is being generated. In process 1000, the device discovery request 1002 is broadcasted directly from the RTG 502 to the devices 504-518, rather than to the ring supervisor 504. Additionally, upon transmitting the device discovery request 1002, the RTG 502 initiates a device discovery timer 1004. The device discovery timer 1004 sets a time limit for the devices 504-518 to respond to the device discovery request 1002. In some embodiments, the time limit is predetermined and stored within the RTG 502. In other embodiments, the time limit may be updated by a based on the ring for which the topology is being generated. The time limit sets a period of time for which the available devices 504-518 may respond to the device discovery request 1002.

Upon receiving the device discovery request 1002, each of the devices 504-518 receives the device ID of the Ethernet ring 520 for which the topology is being generated. Each of the available devices 504-518 within the ring 520 responds to the device discovery request 1002 by transmitting a device discovery response 1006. In some embodiments, the devices 504-518 may only transmit a device discovery response 1006 if their local ring ID for ring 520 matches the device ID included in the device discovery request 1002. In some embodiments, the device discovery response 1006 comprises a message ID, set to 2 as this is the second message, a ring ID to identify ring 520, a device ID, and a ring state, set to either 0 to indicate that the ring 520 is open, or set to 1 to indicate that the ring is closed. The device ID may comprise a unique identifier for the specific device, such as BACnet object identifiers, a logical name, or another pre-existing ID of the device. In some embodiments, the RTG 502 will wait for device discovery responses 1006 from each of the devices 504-518, from the start device discovery timer 1004 until the device discovery timer expires 1008.

Upon receiving a device discovery response 1006 from each of the available devices 504-518, or upon the device discovery timer expiration 1006, the RTG 502 may create a ring members data structure and populate the data structure with the information within the received device discovery responses 1006. In one embodiment, the data structure is a Ring Members List, such as Table 6, shown below.

TABLE 6

Ring Members List after Device Discovery Procedure
Ring Members List

| Ring Device ID | IP Address | Port To Previous Ring Device | Port To Next Ring Device |
|---|---|---|---|
| Device C | 192.168.10.4 | — | — |
| Device F | 192.168.10.7 | — | — |
| Device B | 192.168.10.1 | — | — |
| Device G | 192.168.10.6 | — | — |
| Ring Supervisor | 192.168.10.10 | — | — |
| Device D | 192.168.10.3 | — | — |
| Device A | 192.168.10.2 | — | — |
| Device E | 192.168.10.5 | — | — |

When the device discovery timer expires at 1008, the RTG 502 ends the device discovery process 1000 and determines if the ring 520 is in an open or closed state based on the responses from the devices 504-518 within the ring 520. The device discovery responses 1006 comprise an indication of if the device is in an open or closed state. If the ring 520 is open, the RTG 502 will initiate the ring state query process 1200 or the ring state notification process 1300, as described in greater detail below. In some embodiments, when the state of ring 520 transitions to closed, the RTG 502 may clear the Ring Member's List and re-initiate device discovery process 1000 in order to rediscover all of the devices 504-518 within the ring 520.

Figure 11:
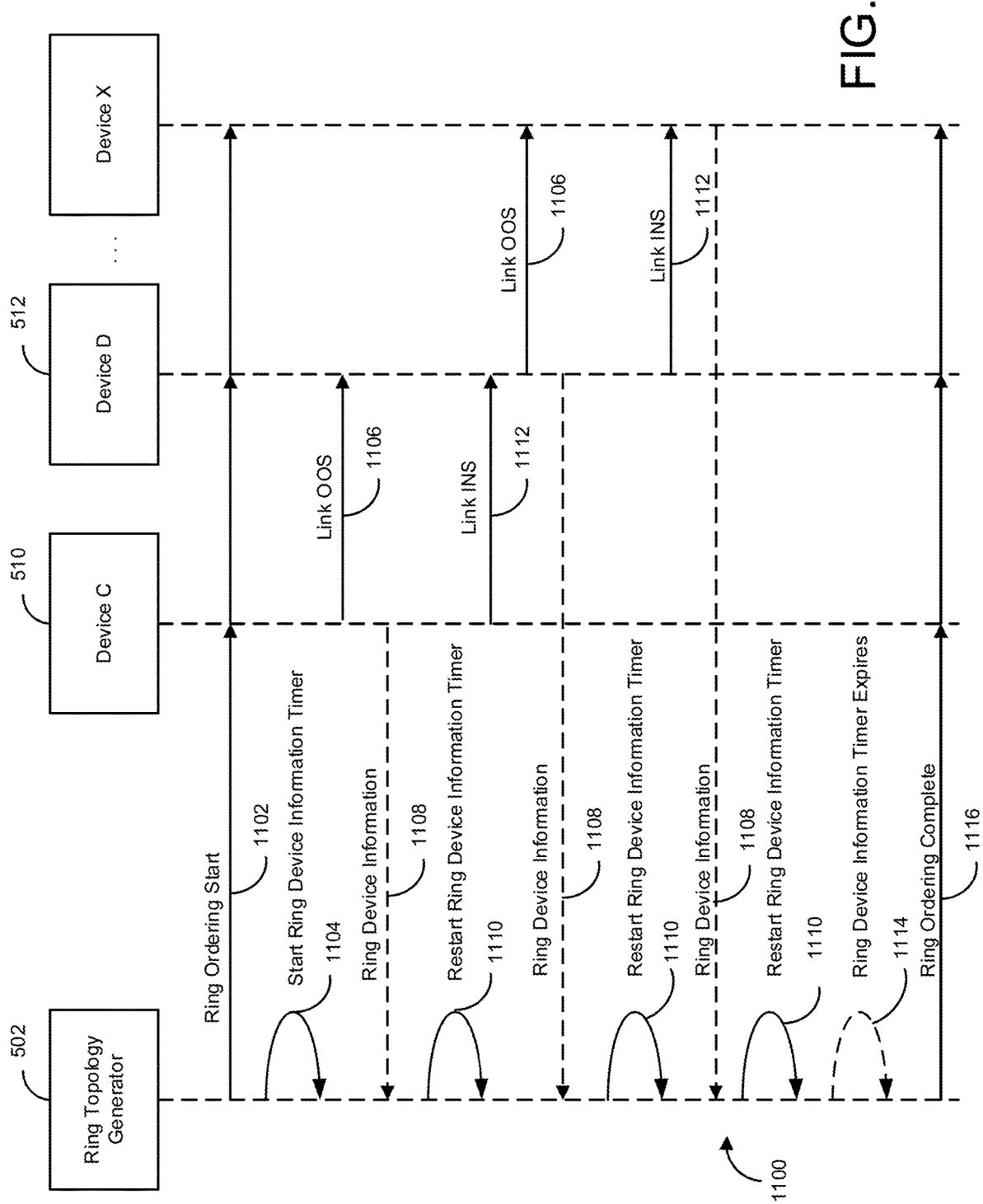
FIG. 11 is a data flow chart illustrating a process for device ordering and Ethernet port orientation, according to some embodiments.

After the devices 504-518 of the Ethernet ring are discovered, and it has been determined that the MRP ring state of the devices 504-518 are all closed, the RTG 502 initiates an Ethernet port orientation process 1100, as shown in FIG. 11, to orient the ports of the devices 504-518 relative to each other. The Ethernet port orientation process 1100 is initiated by a broadcast from the RTG 502 to the devices 504-518. In one embodiment, the process 1100 determines the order of the devices 504-518 and the orientation of the ports relative to the adjacent ring devices (i.e., which ports of the device are connected to each adjacent device.) In some embodiments, the Ethernet port orientation process 1100 relies on the order in which the devices 504-518 respond to the RTG 502 during device discovery process 1000, which is also the order of the devices 504-518 as shown in the Ring Members List of Table 6. As device C 510 is the first device in the list, device C 510 will be the first device to be tested and oriented by the Ethernet port orientation process 1100.

The Ethernet port orientation process 1100 is initiated by the RTG broadcasting a ring ordering start message 1102 to each of the devices 504-518. In some embodiments, the ring ordering start message 1102 may comprise a message ID, which may be set to 3 to indicate it is the third message, a ring ID acting as an identifier for the ring 520, and an indication of the initial device under test, such as the device ID of which device 506-518 is to initiate the process. The first device within the Ring Member's List, for example device C 510 as shown in FIG. 11 and Table 6, may be the initial device under test. After testing the initial device, the Ethernet port orientation process 1100 may test each additional device, as determined by the order in the Ring Member's List. Additionally, upon transmitting the ring ordering start message 1102, the RTG 502 initiates a ring device information timer 1104. The ring device information timer 1104 sets a time limit for the devices 504-518 to respond to the ring ordering start message 1102. In some embodiments, the time limit is predetermined and stored within the RTG 502. In other embodiments, the time limit may be updated by a based on the ring for which the orientation is being generated. The time limit sets a period of time for which the currently tested device 504-518 may respond to the ring ordering start message 1102.

Figure 12:
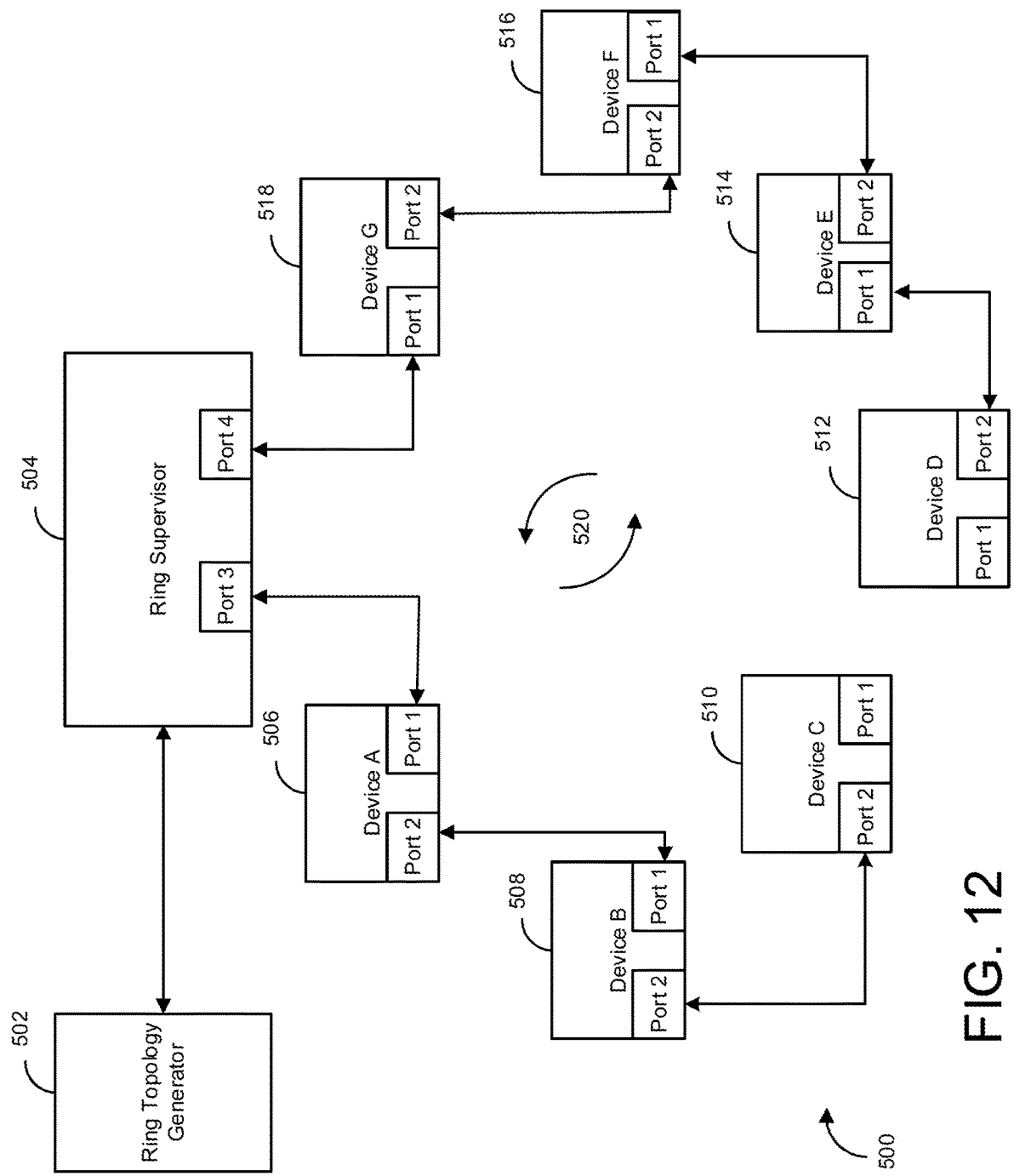
FIG. 12 is a block diagram illustrating a network connected to a plurality of devices, according to some embodiments.

Upon receiving the ring ordering start message 1102, each of the devices 504-518 record that the ring ordering and Ethernet port orientation process 1100 is in progress. The ring ordering start message 1102 may also inform the devices 504-518 that the Ethernet port orientation process 1100 has started, such that if one of their links goes OOS, the ring ordering start message 1102 may indicate that they are now the device under test. The ring ordering start message 1102 indicates the order of the devices to be tested. Upon receipt of the ring ordering start message 1102, the first device under test (device C 510) disables one of its Ethernet ports (1 or 2), as determined by a command to disable the port included within the ring ordering start message 1102. In some embodiments, the lowest numbered Ethernet port (port 1), is disabled first. Referring now to FIG. 12, a block diagram illustrating the networked system 500 with a disabled port 1 on device C 510 is shown. As seen in FIG. 12, the link between port 1 of device C 510 and port 1 of device D 512 is terminated due to the disabled port. After the device C 510 disables a port, device C 510 waits for a notification from the ring supervisor 504 that indicates that the ring is in an open state, due to the port being disabled. In some embodiments, the ring 520 is an MRP ring, the change in the state of the ring may be provided by an MRP test frame. Once device C 510 has been notified by the ring supervisor 504 that the ring 520 is in an open state, device C 510 transmits a ring device information message 1108 back to RTG 502.

Ring device information message 1108 is sent from device C 510, or whichever device 506-518 is currently being tested, back to the RTG 502 to identify the device C 510 location and orientation within the ring 520. In some embodiments, ring device information message 1108 comprises a message ID, which may be set to 4 to indicate that it is the fourth message, a port to previous ring device, and a port to next device. The port to previous ring device indicates which Ethernet port of device C 510 is connected to the previous device in the ring 520. The port to next ring device indicates which Ethernet port of device C 510 is connected to the next device in the ring 520. The determination of port to previous rind device and port to next ring device is described in further detail below. Device C 510 autonomously re-enables the disabled port after sending the ring device information message 1108. Additionally, there may be a restart of ring device information timer 1110 after RTG 502 has received ring device information message 1108 from device C 510. A restart of ring device information timer 1110 may occur after each tested device has sent a ring device information message 1108 to RTG 502.

Additionally, upon receiving the ring device information message 1108 from device C 510, the RTG 502 may update the data structure with the information received from the ring device information message 1108. For examples, the port to previous ring device may be added to Ring Members List in the "Port to Previous Ring Device" column, and the port to next ring device may be added to Ring Members List in the "Port to Next Ring Device" column. In one embodiment, the updated Ring Members List, is shown as Table 7 below.

TABLE 7

Ring Members List with Initial Ring Information Based on Initial Device Ring Members List

| Ring Device ID | IP Address | Port To Previous Ring Device | Port To Next Ring Device |
|---|---|---|---|
| Device C | 192.168.10.4 | 2 | 1 |
| Device F | 192.168.10.7 | — | — |
| Device B | 192.168.10.1 | — | — |
| Device G | 192.168.10.6 | — | — |
| Ring Supervisor | 192.168.10.10 | — | — |
| Device D | 192.168.10.3 | — | — |
| Device A | 192.168.10.2 | — | — |
| Device E | 192.168.10.5 | — | — |

When device C 510 has disabled port 1, the second device in the Ring Member's List (in this case, device D 512) detects the link terminated by its Ethernet port 1, as port 1 of device C 510 is connected to port 1 of device D 512. The terminated link can be seen in FIG. 12. Link termination 1106 of the Ethernet port 1 may be detected by device D 512. In some embodiments, the link between port 1 of device D 512 and port 1 of device C 510 may correspond to a physical link layer (layer 1) as well as a data link layer (layer 2), which may handle the movement of data between adjacent nodes in the ring 520. Upon detecting the terminated link, device D 512 may automatically determine that it is the next device to be tested. Device D 512 may then locally identify Ethernet port 1 as the Port to Previous Ring Device, which may later by transmitted to RTG 502 in order to update Ring Member's List.

Figure 13:
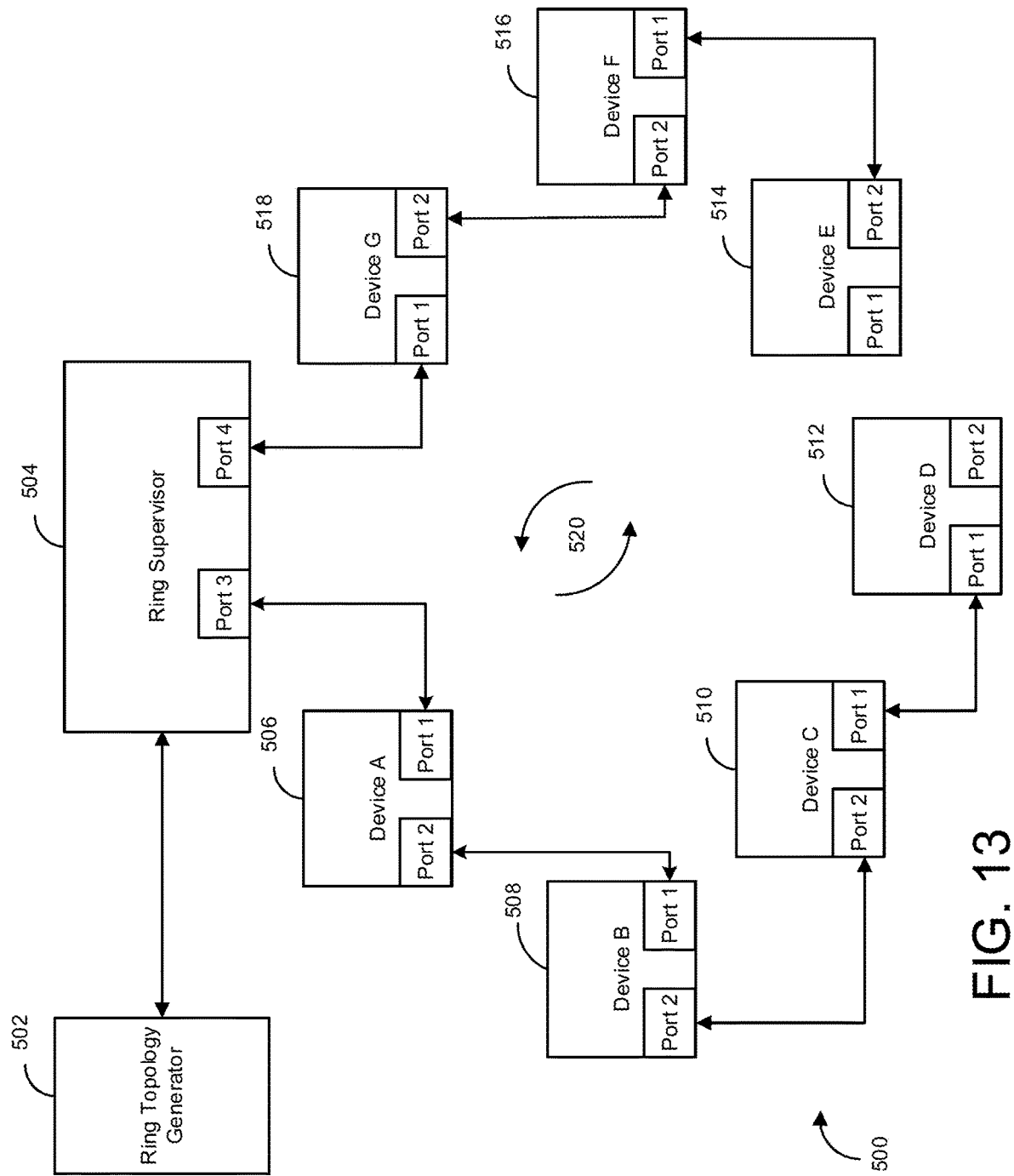
FIG. 13 is a block diagram illustrating a network connected to a plurality of devices, according to some embodiments.

After the second device, device D 512, has detected the link and identified that it is the next device under test, device D 512 waits for the ring 520 to transition back to the closed state. This transition occurs when device C 510 re-enables port 1, and the link is restored between port 1 of device C 510 and port 1 of device D 512. Device D 512 identifies that the link has been restored 1112 and identifies that the ring is in the closed state, and device D 512 is now under test. Upon transitioning back to the closed state, the next device under test (device D 512) disables one of its Ethernet ports. The Ethernet port which has not already had a link terminated is disabled. As the link between port 1 of device D 512 was already terminated during testing of device C 510, device D 512 will proceed with disabling port 2. As seen in FIG. 13, disabling port 2 of device D 512 terminates the link between port 2 of device D 512 and port 1 of device E 514. After device D 512 disables a port, device D 512 waits for a notification from ring supervisor 504 that the ring is in an open state, due to the port being disabled. Once device D 512 has been notified by the RTG 502 that the ring 520 is in an open state, device D 512 transmits a ring device information message 1108 back to RTG 502.

Ring device information message 1108 is sent from device D 512 back to the RTG 502 to identify the device D 512 location and orientation within the ring 520. Similarly to ring device information message 1108 sent from device C 510, ring device information message 1108 comprises a message ID, which may still be set to 4 to indicate this is the fourth message in the testing procedure, a port to previous ring device, and a port to next device. Device D 512 autonomously re-enables the disabled port after sending the ring device information message 1108. Additionally, RTG 502 may restart the ring device information timer 1110 after receipt of ring device information message 1108 from device D 512.

Additionally, upon receiving the ring device information message 1108 from device D 512, the RTG 502 may update the data structure with the information received from the ring device information message 1108. For example, the port to previous ring device may be added to Ring Members List in the "Port to Previous Ring Device" column, and the port to next ring device may be added to Ring Members List in the "Port to Next Ring Device" column. The port to previous ring device may be determined by the port which had a link terminated during testing of device C 510. The port to next ring device may be determined to be the port that is disabled during testing of device D 512. In one embodiment, the updated Ring Members List, is shown in Table 8 below.

TABLE 8

Ring Members List with Ring Information Based on Second Device Ring Members List

| Ring Device ID | IP Address | Port To Previous Ring Device | Port To Next Ring Device |
|---|---|---|---|
| Device C | 192.168.10.4 | 2 | 1 |
| Device D | 192.168.10.7 | 1 | 2 |
| Device F | 192.168.10.7 | — | — |
| Device B | 192.168.10.1 | — | — |
| Device G | 192.168.10.6 | — | — |
| Ring Supervisor | 192.168.10.10 | — | — |
| Device A | 192.168.10.2 | — | — |
| Device E | 192.168.10.5 | — | — |

When device D 512 has disabled port 2, the third device in the Ring Member's List (in this case, device E 514) detects the link terminated by its Ethernet port 1, as port 2 of device D 512 is connected to port 1 of device E 514. This terminated link can be seen in FIG. 13. Link termination 1106 of the Ethernet port 1 may be detected by device E 514. In some embodiments, the link between port 1 of device E 514 and port 2 of device D 512 may correspond to a physical link layer (layer 1) as well as to a data link layer (layer 2), which may handle the movement of data between adjacent nodes in the ring 520. Upon detecting the terminated link, device E 514 may automatically identify that it is the next device to be tested. Device E 514 may then locally identify Ethernet port 1 as the Port to Previous Ring Device, which may later by transmitted to RTG 502 in order to update Ring Member's List.

Process 1100 continues for each of the devices 504-518 until each device 506-518 within ring 520 has been tested, i.e. has had a port disabled. Upon receiving the ring device information message 1108 from each device 506-518, the RTG 502 may update the data structure with the information received from the ring device information message 1108. In some embodiments, process 1100 continues until device C 510 detects the link terminated by its port 2 and port 2 of device B 508. As device C 510 has already sent the RTG 502 a ring device information message 1008 earlier in the process 1100, device C 510 takes no action, causing the expiration of ring device information timer 1114. Upon expiration of ring device information timer 1114, RTG 502 broadcasts a ring ordering complete message 1116 to the devices 504-518 within ring 520, indicating that the ring ordering and Ethernet port orientation process 1100 is complete. In some embodiments, RTG 502 checks to see if all entries in the Ring Member's List have been populated. If all entries have not been populated, RTG 502 may clear the Ring Member's List and re-initiate process 1100. In other embodiments, if the RTG 502 has found that not all devices have responded with a ring device information message 1108, the RTG 502 may imitate a second port orientation procedure, starting with the same device such as device C 510, but disable the alternative port of the device, thus allowing the process to discover devices 504-518 which may be on the other side of device C 510.

Upon receipt of the ring ordering complete message 1116, all of the devices 504-518 may record that the Ethernet orientation process 1100 is complete, such that a change in the state of one of their Ethernet links will not trigger the Ethernet orientation process 1100 behavior in the device. In some embodiments, ring ordering complement message 1116 may comprise a message ID, which may be set to 5 to indicate that it is the fifth message, and a ring ID acting as an identifier for the ring 520. After successful completion of the process 1100, the data structure will be fully populated. In one embodiment, the completed Ring Members List is shown as Table 9 below.

TABLE 9

Ring Members List with Full Ring Ordering
Ring Members List

| Ring Device ID | IP Address | Port To Previous Ring Device | Port To Next Ring Device |
|---|---|---|---|
| Device C | 192.168.10.4 | 2 | 1 |
| Device D | 192.168.10.3 | 1 | 2 |
| Device E | 192.168.10.5 | 1 | 2 |
| Device F | 192.168.10.7 | 1 | 2 |
| Device G | 192.168.10.6 | 2 | 1 |
| Ring Supervisor | 192.168.10.10 | 3 | 4 |
| Device A | 192.168.10.2 | 1 | 2 |
| Device B | 192.168.10.1 | 1 | 2 |

In some embodiments, the topology of Ethernet ring 520 is regenerated each time the Ethernet ring 520 transitions from open to close, or vice versa. In some embodiments, the RTG 502 may periodically query one of the devices 504-518 within the Ethernet ring 520 in order to determine the ring state. An exemplary embodiment of the ring state query procedure is shown in FIG. 12. In other embodiments, the RTG 502 may subscribe to ring state change notifications from one or more of the devices 504-518 within the Ethernet ring 520, such that the devices 504-518 provide the RTG 502 with an identification of when the Ethernet ring 520 has changed states. An exemplary embodiment of a ring state notification procedure, where the devices 504-518 provide an indication of a ring state change to the RTG 502, as shown in FIG. 15.

Figure 14:
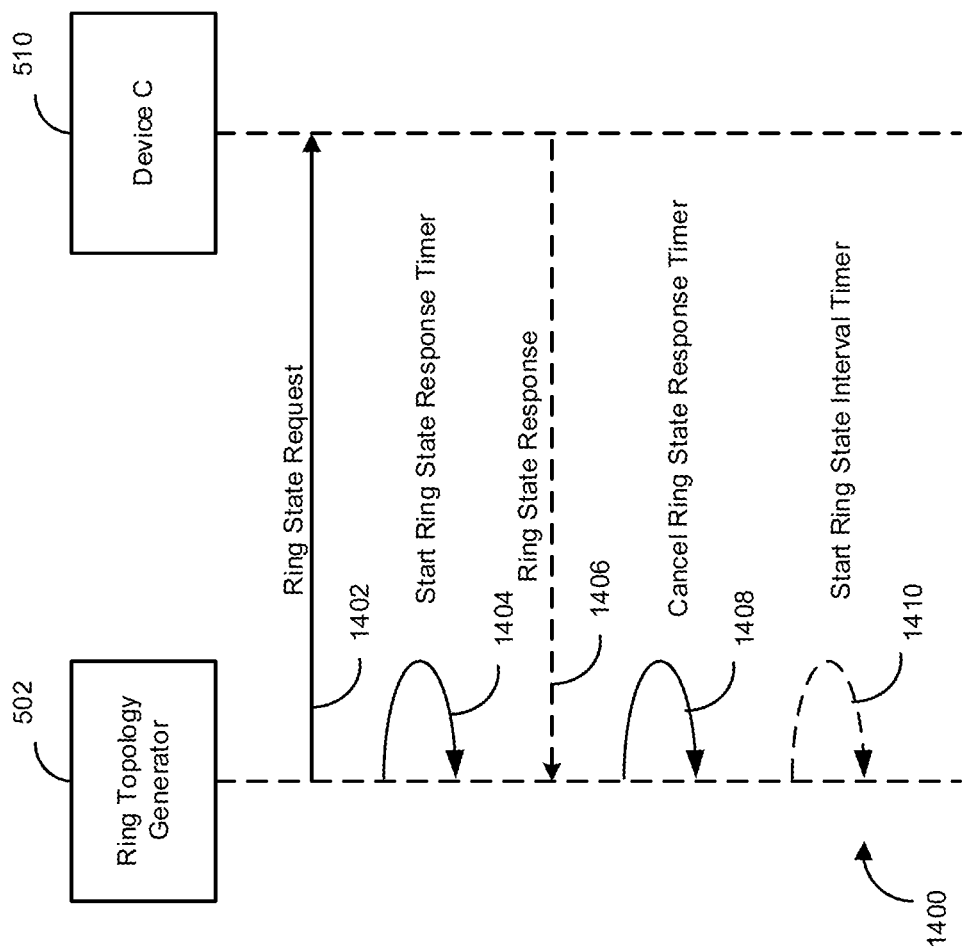
FIG. 14 is a data flow chart illustrating a ring state query process, according to some embodiments.

Turning now to FIG. 14, a data flow chart illustrating a ring state query process 1400 for determining the state of the devices 504-518 within an Ethernet ring is shown, according to some embodiments. As stated above, the ring state query process 1400 is used to query the device 506-518 of the Ethernet ring 520 for the status of the ring 520. In some embodiments, the RTG 502 may periodically query one of the devices 504-518 to determine the status of the ring 520. The RTG 502 first transmits a ring state request 1402 to the devices 504-518. In some embodiments, the ring state request 1402 may comprise a message ID, which may be set to 6 to indicate that it is the sixth message, and a ring ID acting as an identifier for the ring 520. In some embodiments, the RTG 502 will transmit the ring state request 1402 to a particular device, for example to device C 510 as shown in FIG. 14. In other embodiments, the RTG 502 will transmit the ring state request 1402 to a different singular device, or to multiple devices 504-518. The ring state request 1402 requests the current ring state of the ring 520. Upon transmitting the ring state request 1402, the RTG 502 initiates a ring state response timer 1404. The ring state response timer 1404 sets a time limit for the device 506-518, which have received the ring state request 1402, to respond to the ring state request 1402, via a ring state response 1406.

Upon receipt of the ring state request 1402 at device C 510, device C 510 may respond with a ring state response 1406. In some embodiments, the ring state response 1406 may comprise a message ID, which may be set to 7 to indicate that it is the seventh message, a ring ID acting as an identifier for the ring 520, and a state of the ring 520. The ring state may be set to either 0, to indicate the ring 520 is open, or to 1, to indicate that the ring 520 is closed. If the ring 520 is an MRP ring, the ring state is set based on the MRP ring state reported in the most recently received MRP test message. Once the RTG 502 receives the ring state response 1406, the ring state response timer is cancelled 1408. If, however, a ring state response timer 1408 has not been received by expiration of the ring state response timer, the RTG may initiate a ring state interval timer 1410, and the RTG 502 may repeat the ring state query process 1400. The process 1400 may be repeated continuously, based on the ring state interval timer 1410, until a ring state response 1406 has been received at the RTG 502. Process 1400 provides a method for the RTG to periodically query the ring 520 in order to determine if the ring state has changed.

Figure 15:
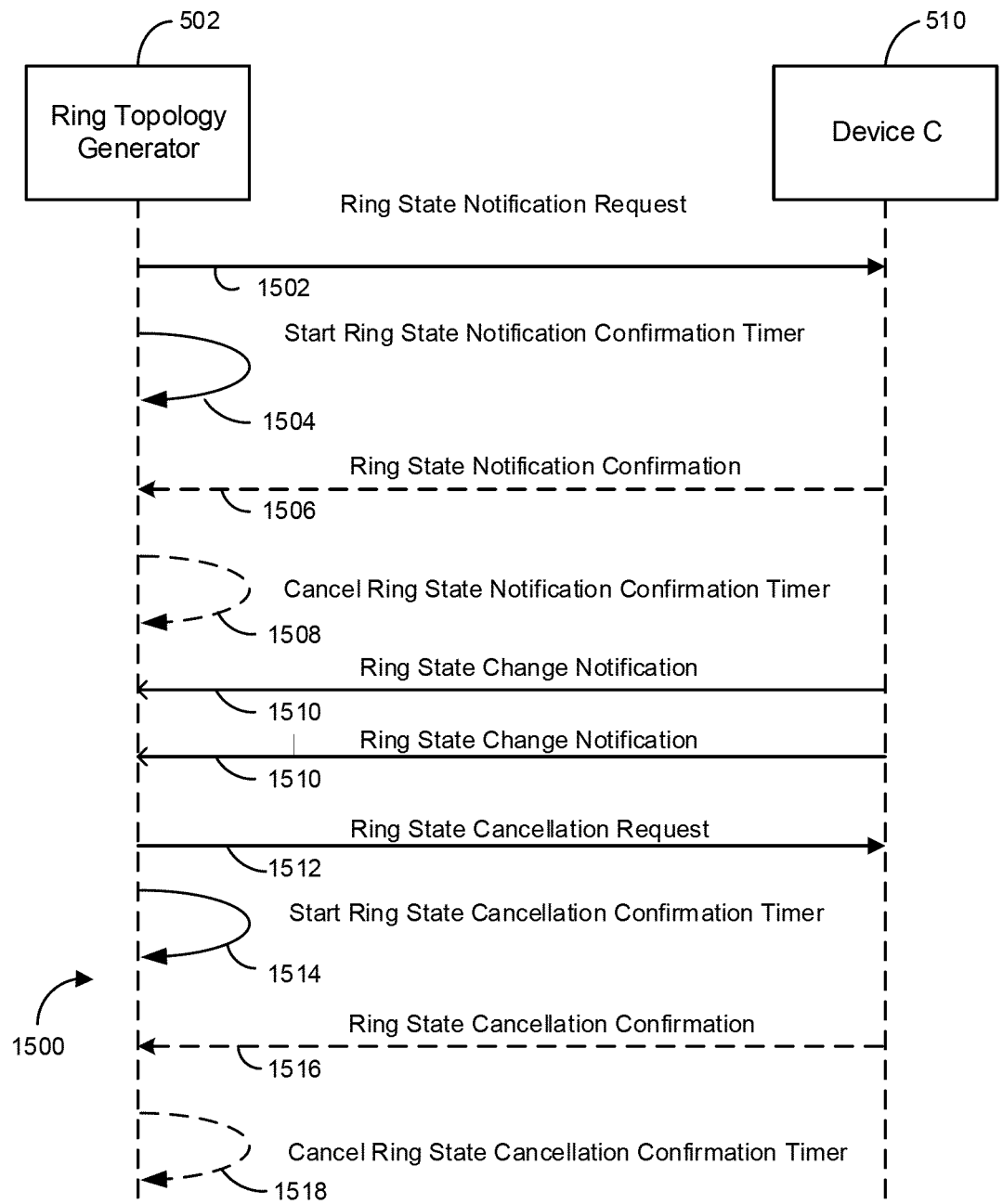
FIG. 15 is a data flow chart illustrating a ring state notification procedure, according to some embodiments.

Referring now to FIG. 15, an exemplary embodiment of a ring state notification process 1500, where the devices 504-518 provide an indication of a ring state change to the RTG 502 is shown. In contrast to process 1400, process 1500 provides a mechanism for RTG 502 to be notified as soon as the ring state changes, rather than periodically querying the devices 504-518. Ring state notification process 1500 allows the RTG 502 to request to be notified when the state of ring 520 changes, e.g., transitions from open to closed or vice-versa. In some embodiments, process 1500 notifies RTG 502 immediately upon the change of state of ring 520.

Process 1500 is initiated by RTG 502 broadcasting a ring state notification request 1502 to the devices 504-518. In some embodiments, the ring state notification request 1502 may comprise a message ID, which may be set to 8 to indicate that it is the eight message, and a ring ID acting as an identifier for the ring 520. In some embodiments, the RTG 502 will transmit the ring state notification request 1502 to a particular device, for example to device C 510 as shown in FIG. 15. In other embodiments, the RTG 502 will transmit the ring state notification request 1502 to multiple device 506-518. It may be beneficial to transmit the ring state notification request 1502 to multiple devices 504-518, as RTG 502 is unaware of which devices 504-518 may be offline and are unreachable. Upon transmitting the ring state notification request 1502, the RTG 502 initiates a ring state notification confirmation timer 1504. The ring state notification confirmation timer 1504 sets a time limit for the device 506-518, which have received the ring state notification request 1502 to respond to the ring state notification request 1502 via a ring state notification confirmation 1506.

Upon reception of the ring state notification request 1502, the device 506-518 which received the ring state notification request 1502, in this case device C 510, stores the address of the RTG 502. Device C 510 also responds with a ring state notification confirmation 1506. Sending the ring state notification confirmation 1506 indicates that device C 510 will indicate to the RTG 502 whenever there is a change of state of the ring 520. In some embodiments, ring state notification confirmation 1506 may comprise a message ID, which may be set to 9 to indicate that it is the ninth message, and a ring ID acting as an identifier for the ring 520. The ring state notification confirmation 1506 is sent by the device C 510, or any of the devices 504-518 which received the ring state notification request 1502, in order to notify the RTG 502 that the RTG 502 has been successfully registered to receive ring state change notifications from device C 510. Upon reception of the ring state notification confirmation 1506 by the RTG 502, the RTG 502 may cancel the ring state notification confirmation timer 1508. If the ring state notification confirmation 1506 has not been received by an expiration of the ring state notification confirmation timer, it may be assumed that the device C 510 is unreachable, and thus ring 520 is in an open state.

When the state of ring 520 changes, device C 510 will notify RTG 502 of the change in state. Device C 510 sends a ring state change notification 1510 to RTG 502 in order to indicate the change of state. In some embodiments, ring state change notification 1510 may comprise a message ID, which may be set to 10 to indicate that it is the tenth message, a ring ID acting as an identifier for the ring 520, and a ring state, set to either 0 or 1. If the ring 520 is an Ethernet ring using MRP, the ring state is based on the MRP ring state reported in the most recently received MRP test message. Anytime the state of ring 520 changes, device C 510 will send another ring state change notification 1510 to RTG 502. Thus, RTG 502 is notified of changes in ring state as soon as they occur, rather than having to periodically query the devices 504-518.

If it is decided that the RTG 502 no longer wishes to receive ring state change notifications 1510, the RTG 502 may broadcast a ring state cancellation request 1512. The ring state cancellation request 1512 may be broadcasted to any of the devices 504-518 currently providing state changes of the ring 520 to the RTG 502. This may be any of the devices 504-518 which received the ring state notification request 1502 and responded with a ring state notification confirmation 1506. In some embodiments, the ring state cancellation request 1512 may comprise a message ID, which may be set to 11 to indicate that it is the eleventh message, and a ring ID acting as an identifier for the ring 520. Upon transmitting the ring state cancellation request 1512, the RTG 502 initiates a ring state cancellation confirmation timer 1514. The ring state cancellation confirmation timer sets a time limit for the devices 504-518, which have received the ring state cancellation request 1512 to respond to the ring state cancellation request 1512 via a ring state cancellation confirmation 1516.

Upon receipt of the ring state cancellation request 1512 at device C 510, or whichever devices 504-518 have received the request 1512, device C 510 is instructed to stop sending ring state change notifications 1510. Device C 510 clears the address of RTG 502 so that ring state change notifications 1510 can no longer be sent. Additionally, upon receipt of the ring state cancellation request 1512, device C 510 responds by broadcasting a ring state cancellation confirmation 1516 to RTG 502. In some embodiments, ring state cancellation confirmation 1516 may comprise a message ID, which may be set to 12 to indicate that it is the twelfth message, and a ring ID acting as an identifier for the ring 520. The ring state cancellation confirmation 1516 is sent by the device C 510, or any of the devices 504-518 which received the ring state cancellation request 1512, in order to notify the RTG 502 that the ring state cancellation request 1512 has been received and that ring state change notifications 1510 will no longer be sent from that particular device 506-518 to the RTG 502. Once the RTG 502 receives the ring state cancellation confirmation 1516, the ring state cancellation confirmation timer is cancelled 1518. If, however, the ring state cancellation confirmation 1516 has not been received by the RTG 502 by the time the ring state cancellation confirmation timer expires, an additional ring state cancellation request 1512 may be sent by the RTG 502. The ring state cancellation request 1512 may be periodically sent by the RTG 502 until a ring state cancellation confirmation 1516 is received by the RTG 502.

Figure 16:
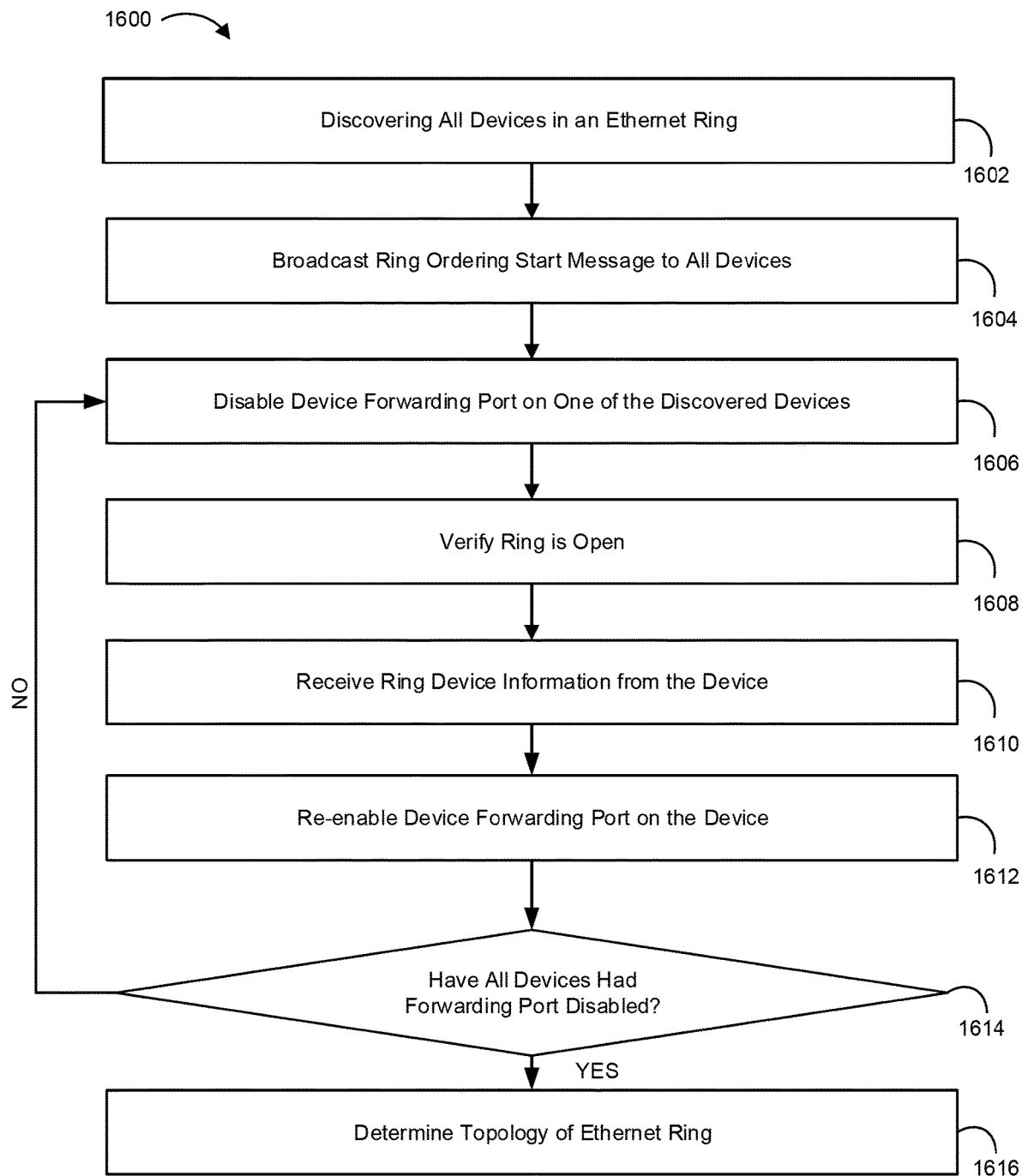
FIG. 16 is a flow diagram illustrating a process for determining a topology of an Ethernet ring, according to some embodiments.

Turning now to FIG. 16, a flow diagram illustrating a process 1600 for determining a topology of an Ethernet ring is shown, according to some embodiments. The process 1600 may be a combination of the processes 1000, 1100, 1400, and 1500 described above. In one embodiments, the process 1600 operates at the application layer, allowing the topology of the Ethernet ring 520 to be determined by communicating directly with the devices in the ring, rather than relying on messaging type specific to the ring protocol to provide the topology information. In some embodiments, an RTG, such as RTG 502 described above, may be responsible for performing the various steps of the process 1600. In one example, the RTG may interface with a user, such as via a graphical user interface (GUI), to allow a user to both configure the RTG and to present the user with a graphical representation of the generated ring topology, in some embodiments. In one embodiment, when the RTG is initialized or launched, the RTG will initially generate the topology of the configured Ethernet ring as described below. Further, the RTG may continue to monitor the status of the ring to determine if/when the topology needs to be re-generated. For example, the RTG may regenerate the ring topology whenever the ring status transitions from open to closed to account for the addition/deletion of devices to the Ethernet ring as well as any cabling changes within the Ethernet ring (e.g. if the cables going into a particular device's Ethernet ports were swapped.)

At process block 1602, all the devices within the Ethernet ring or a daisy chain are determined. In one embodiment, an RTG, such as RTG 502 may execute a process to discover all of the devices within the Ethernet ring. For example, the RTG may use a process such as process 900 described above to discover all the devices in the Ethernet ring. The RTG may also determine other information about the devices, such as IP addresses of the devices, device types, associated other devices, associated sub-networks, or the like.

At process block 1604, the RTG transmits a ring order start message to the devices within the Ethernet ring in order to identify that a ring ordering procedure is occurring. The ring order start message may comprise an indication of which device will be the first device under test, based on the devices discovered at process block 1602.

At process block 1606, the RTG transmits an instruction to a device within the Ethernet ring and instructs the device to disable one of the Ethernet ports of the device. The first device to be instructed to disable the Ethernet port may be the first device discovered while discovering the device in process block 1602, and may be indicated by the ring order start message sent at process block 1604. The ring devices may then determine if the Ethernet ring is open at process block 1608, indicating that a link is down between the device with the disabled port and its neighboring device. In some embodiments, the RTG may initiate a timer to wait for a ring device information message from one of the devices in the ring which will indicate whether or not the ring is open.

Once the device determines that the Ethernet ring is open, the device sends a ring device information to the RTG at process block 1610. In some embodiments, the device may be sent as a unicast message to the RTG. The ring device information may include a message ID indicating that the message is a ring device information message. The ring device information message identifies which port has been disabled on the device, which the RTG then stores.

After broadcasting the ring device information, the device may re-enable the device forwarding port at process block 1612. The RTG then determines if all of the previously discovered devices within the Ethernet ring have had a port disabled at process block 1616. If the RTG determines that not all of the previous devices have had an Ethernet port disabled, the process 1600 returns to process block 1606, and process block 1606-1612 are repeated for each discovered device. If the RTG does determine that all of the devices have had their Ethernet ports disabled, the RTG may determine a topology of the Ethernet ring (e.g. determine the order of the discovered devices within the ring) at process block 1616. In one embodiment, the RTG may determine the topology of the devices in the Ethernet ring by ordering the devices based on the order of which the Ethernet ports are disabled on the discovered devices.

In some embodiments, the RTG may utilize the generated topology to be able to identify the location of one or more breaks in an Ethernet ring. For example, whenever a ring device's Ethernet port goes out of service (OOS), the device could send a message to the RTG reporting the OOS port. The RTG could then map the port to the current ring topology and mark the port to indicate the OOS status of the port. In other embodiments, failure or break events should be generated in pairs (i.e., if one end of a connection between two devices within the Ethernet ring goes OOS, then the other should as well, such that the RTG should mark both ends of the connection OOS. If another break in the ring is detected, the connectivity to one or more devices in the ring will be lost. Thus, it is important to make the user aware of the first break within the ring before the second break occurs, as this can prevent the loss of connectivity to multiple devices within the ring. If the second break does occur, the impacted devices can be determined based on the most recently determined topology of the ring. The RTG could determine the devices which have no connectivity based on the most recent ring topology and indicate to a user which devices have lost connection. In some embodiments, the topology of the ring may be displayed graphically, such as via a graphical user interface (GUI) of a webserver in order to give a user a clear and concise view of the status of the ring and the devices within the ring. Whenever a ring device's Ethernet port goes OOS, this may be visually represented on the GUI in order to identify to a user which devices may be affected.

Figure 17:
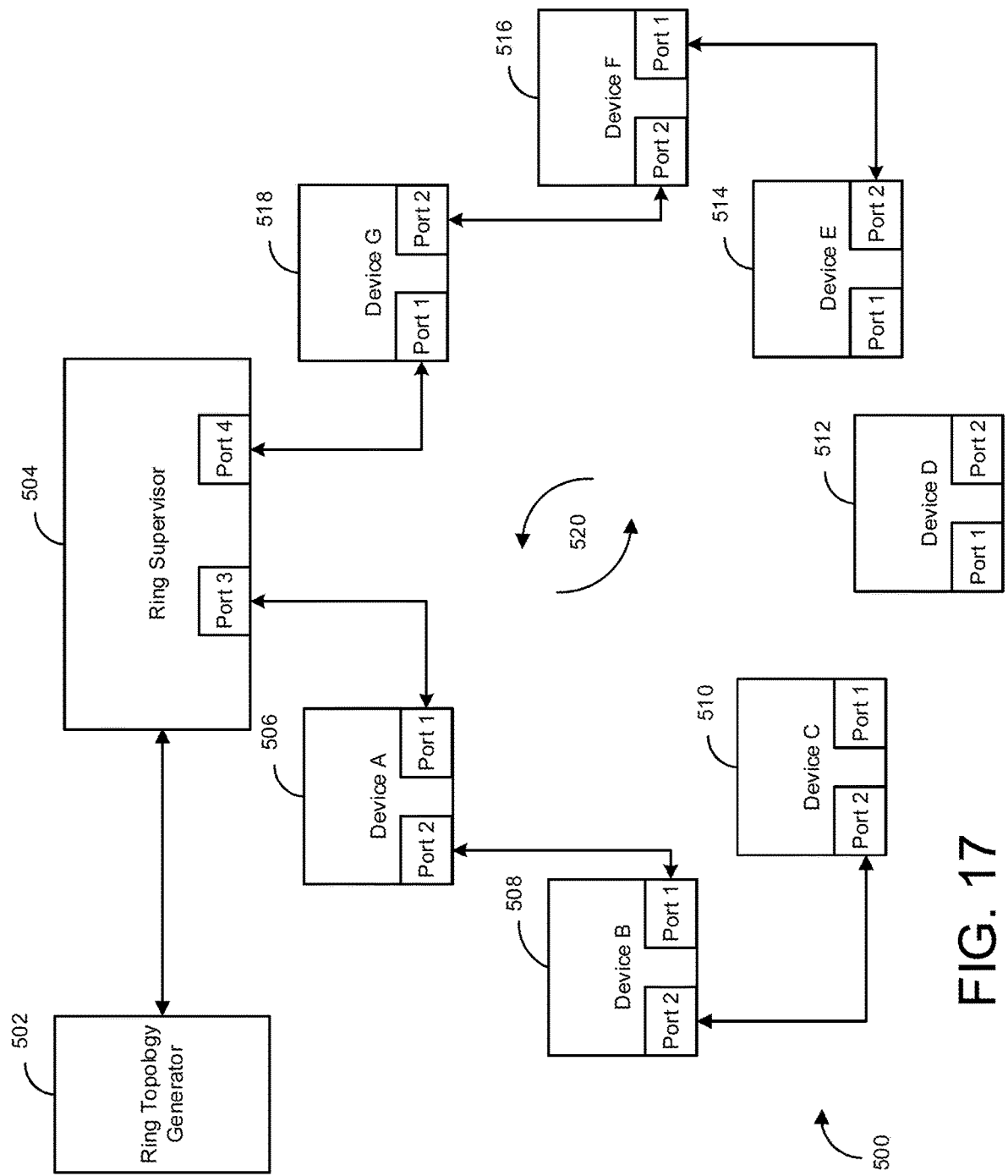
FIG. 17 is a block diagram illustrating a network connected to a plurality of devices, according to some embodiments.

In some embodiments, upon a change in status of an Ethernet port of a ring device, the device may report the new status of the Ethernet port to the RTG. In some embodiments, this status may be reported using process 1500. In the case of a single break in the ring, two devices should report a change in status of one of their Ethernet ports, as two devices will be affected by a broken link. As seen in FIG. 12, both device C 510 and device D 512 would report a change in the status of the link terminated between port 1 of device C 510 and port 1 of device D 512. Thus, the RTG can easily identify where the broken link is and which ports have been affected. In the case of a failure of a device, the Ethernet ports on the devices on both sides of the failed device should report a change in their status. Based on the current topology of the ring, the RTG can determine which device (or devices) are not reachable based on the Ethernet ports whose links are determined to be down. For example, as seen in FIG. 17, when device D 512 fails, both device C and device E would report a change in status of the link which was connected to device D 512, as they are on either side of device D 512.

Figure 18:
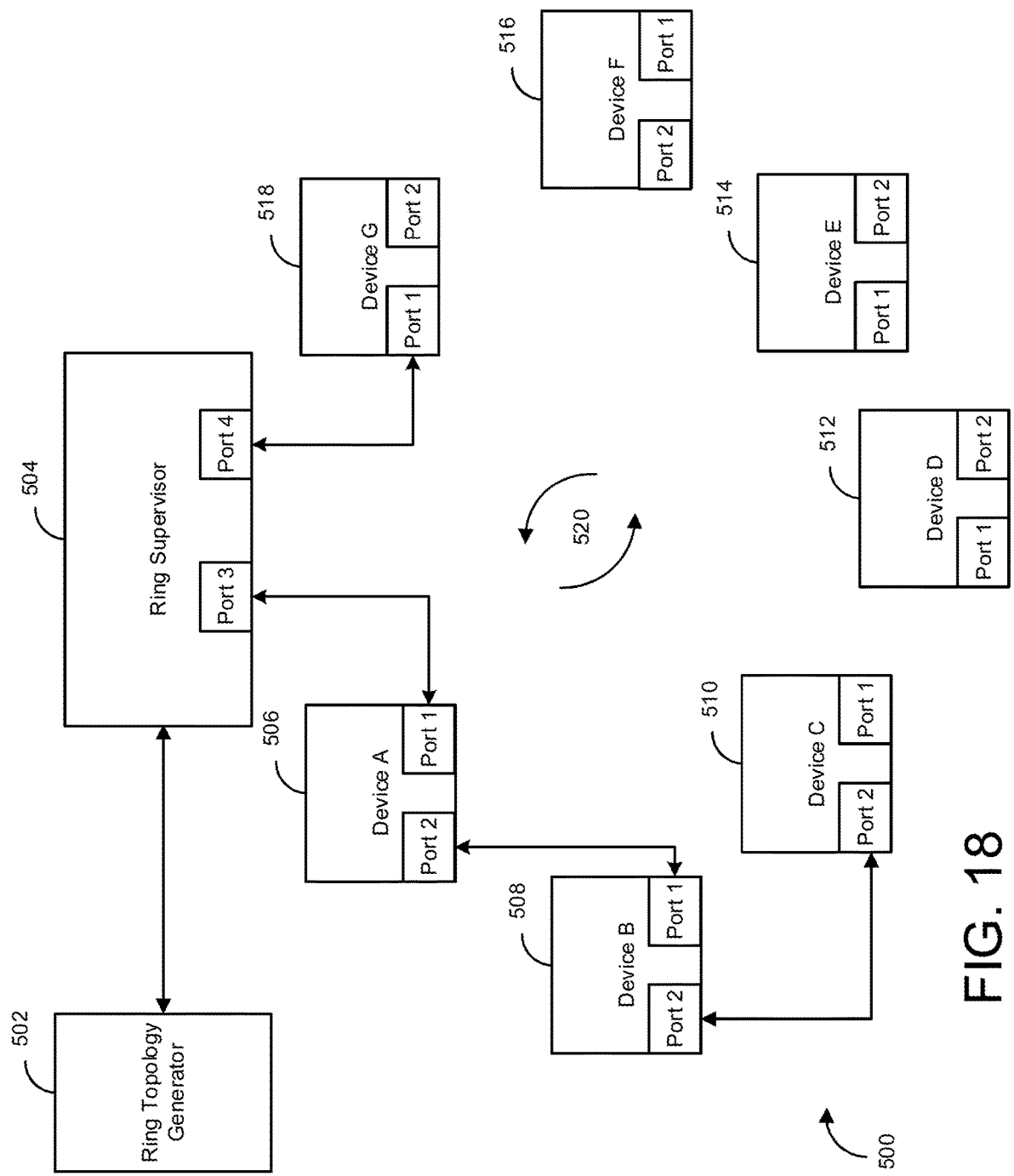
FIG. 18 is a block diagram illustrating a network connected to a plurality of devices, according to some embodiments.
Figure 19:
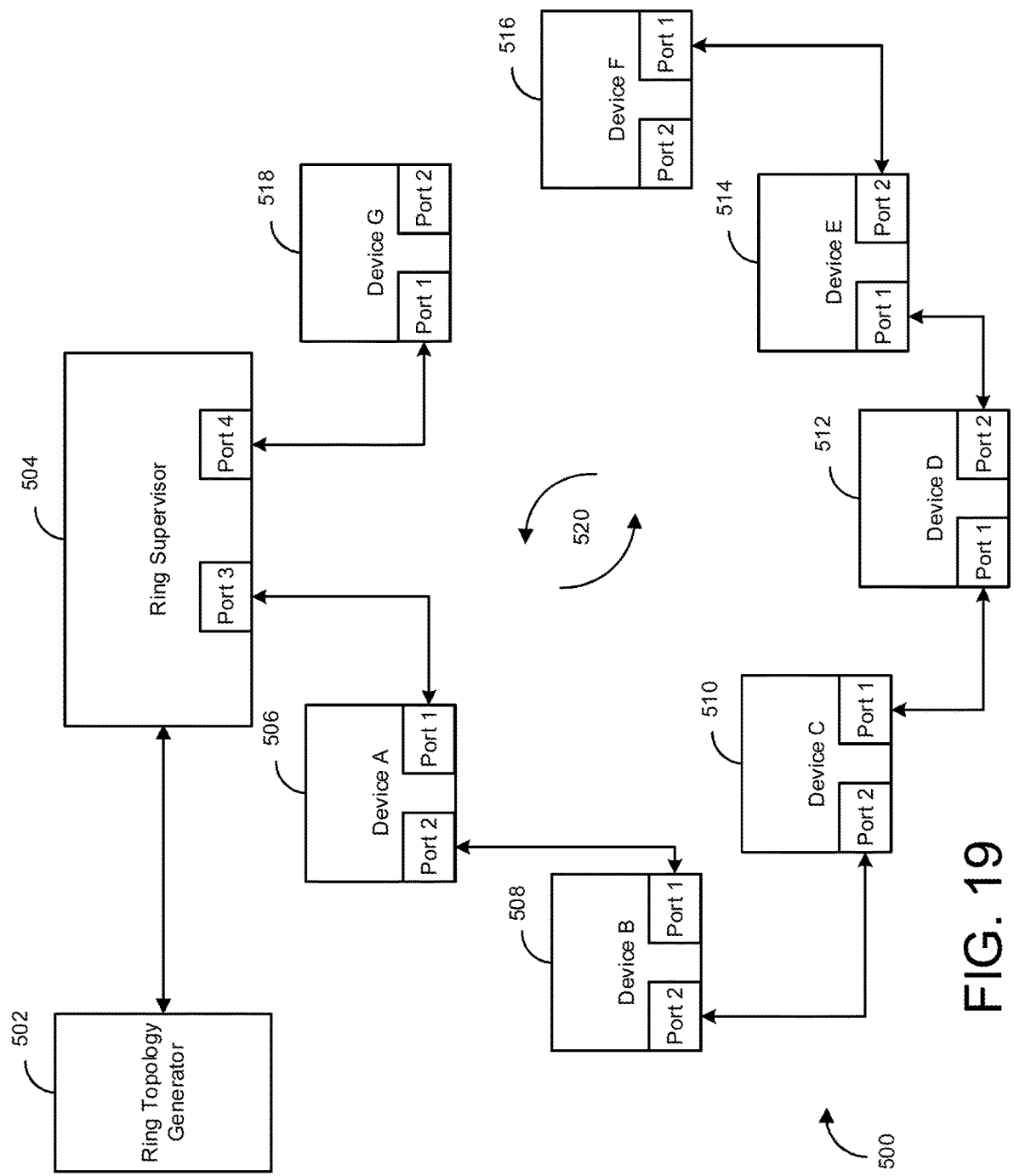
FIG. 19 is a block diagram illustrating a network connected to a plurality of devices, according to some embodiments.

In the case of two breaks within the ring, such as shown in FIG. 18, the devices on either side of both breaks would report a change in the status of their links facing the break. As shown in FIG. 18, a broken link between both device F 516 and device G 518 as well as between device D 512 and device C 510. Thus, device D 512, device E 514, and device F 516 are all not reachable. The RTG is able to determine which devices are not reachable based on the current topology of the ring and which links are reported as being down. Additionally, repairs to the breaks within the ring may also be reflected in the topology of the ring. Every time a change in link status from down to up is received, the RTG may reassess the connectivity of the devices in the ring as well as the connections between them. If the failed devices are restored, but there is still a break in a link between them, the RTG would determine that all devices are reachable, but that the ring is still open due to the broken link. As seen in FIG. 19, once device D 512 comes back into service, the link between device C 510 and device D 512 is repaired. Thus, devices D 512, E 514, and F 516 are all reachable, even though there is still a broken link between device G 518 and device F 516, thus the ring is still open.

Advantageously, the systems and methods disclosed herein provide a simplified method for determining topology of a ring. The methods require significantly less messaging between the RTG and the devices within the ring in order to generate the topology of the ring without requiring modification of the RTG protocol itself. This reduction in messaging speeds up the time it takes to generate the ring topology, as well as reduces the potential for a lost message which could cause the ring topology generation process to fail. Additionally, these methods do not require any special interaction between the RTG and the ring manager. The RTG application interfaces with the ring devices in the same way regardless of whether the ring device is a ring client or a ring manager, further simplifying the implementation. Additionally, these methods do not require the RTG application to reside outside the ring for which it is determining the topology. Rather, the methods are application to any Ethernet ring where the associated RTG makes a ring identifier and the open/closed status of the ring available to the ring device. Thus, the present disclosure is a portable, lightweight solution that can be applied to Ethernet rings managed by various ring management protocols.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for determining a topology of an Ethernet ring having a plurality of devices, the method comprising:
   transmitting a first port disable command to a first device of the plurality of devices, wherein the first port disable command causes the first device to disable a first port of the first device;
   storing an indication that the first device has been commanded to disable the first port of the first device;
   detecting, by a second device of the plurality of devices, a terminated link at a first port of the second device;
   sending, by the second device, a first message to a ring topology generator in response to the second device detecting the terminated link at the first port of the second device, the first message indicating that the first port of the second device is connected to a port that has been disabled; and
   generating, by the ring topology generator, the topology of the Ethernet ring based on (1) the first message indicating that the first port of the second device is connected to the port that has been disabled and (2) the indication that the first device has been commanded to disable the first port of the first device.

2. The method of claim 1, wherein the topology indicates that the first port of the first device is connected to the first port of the second device.

3. The method of claim 1, further comprising:
   transmitting a second port disable command to the second device, wherein the second port disable command causes the second device to disable a second port of the second device;
   storing an indication that the second device has been commanded to disable the second port of the second device;
   detecting, by a third device of the plurality of devices, a terminated link at a first port of the third device;
   sending, by the third device, a second message to the ring topology generator in response to the third device detecting the terminated link at the first port of the third device, the second message indicating that the first port of the third device is connected to a port that has been disabled; and
   updating, by the ring topology generator, the topology of the Ethernet ring based on (1) the second message indicating that the first port of the third device is connected to the port that has been disabled and (2) the indication that the second device has been commanded to disable the second port of the second device.

4. The method of claim 1, further comprising:
   broadcasting a device discovery command from the ring topology generator to the plurality of devices;
   receiving device discovery information from one or more of the plurality of devices in response to the device discovery command; and
   determining a state of the Ethernet ring based on the received device discovery information.

5. The method of claim 1, further comprising
   broadcasting a ring state request from the ring topology generator to the plurality of devices; and
   receiving a ring state response from one or more of the plurality of devices, the ring state response comprising an indication of the state of the Ethernet ring.

6. The method of claim 1, further comprising performing a ring status query procedure comprising:
   broadcasting a ring state request onto one or more of the plurality of devices;

receiving a ring state confirmation from the one or more devices; and receiving one or more ring state notifications from the one or more devices, the ring state notifications providing an indication that the state of the Ethernet ring has changed.

7. The method of claim 1, further comprising, upon receiving an indication that the Ethernet ring is in an open state, utilizing the topology of the Ethernet ring to determine a device failure or a link breakage causing the Ethernet ring to be in the open state.

8. A system for determining a topology of an Ethernet ring, the system comprising:
a plurality of devices configured in the Ethernet ring; and
a ring topology generator comprising one or more processing circuits configured to:
transmit a first port disable command to a first device of the plurality of devices, wherein the first port disable command causes the first device to disable a first port of the first device;
store an indication that the first device has been commanded to disable the first port of the first device;
receive a first message from a second device of the plurality of devices indicating that a first port of the second device is connected to a port that has been disabled in response to the second device detecting a terminated link at the first port of the second device; and
generate the topology of the Ethernet ring based on (1) the first message indicating that the first port of the second device is connected to the port that has been disabled and (2) the indication that the first device has been commanded to disable the first port of the first device.

9. The system of claim 8, wherein the topology generated by the one or more processing circuits indicates that the first port of the first device is connected to the first port of the second device.

10. The system of claim 8, wherein the second device comprises one or more second processing circuits configured to disable a second port of the second device after the terminated link at the first port of the second device is restored and the one or more processing circuits of the ring topology generator are further configured to:
store, in response to restoring the terminated link at the first port of the second device, an indication that the second device has disabled the second port of the second device;
receive a second message from a third device of the plurality of devices indicating that a first port of the third device is connected to a port that has been disabled in response to the third device detecting a terminated link at the first port of the third device; and
update the topology of the Ethernet ring based on (1) the second message indicating that the first port of the third device is connected to the port that has been disabled and (2) the indication that the second device has disabled the first port of the second device.

11. The system of claim 8, wherein the one or more processing circuits are further configured to:
broadcast a device discovery command from the ring topology generator to the plurality of devices;
receive device discovery information from one or more of the plurality of devices; and
determine a state of the Ethernet ring based on the received device discovery information.

12. The system of claim 8, wherein the one or more processing circuits are further configured to:
broadcast a ring state request from the ring topology generator to the plurality of devices; and
receive a ring state response from one or more of the plurality of devices, the ring state response comprising an indication of the state of the Ethernet ring.

13. The system of claim 8, wherein the one or more processing circuits are further configured to:
broadcast a ring state request onto one or more of the plurality of devices;
receive a ring state confirmation from the one or more devices; and
receive one or more ring state notifications from the one or more devices, the ring state notifications providing an indication that the state of the Ethernet ring has changed.

14. The system of claim 8, wherein the one or more processing circuits are further configured to, upon receiving an indication that the Ethernet ring is in an open state, utilize the topology of the Ethernet ring to determine a device failure or a link breakage causing the Ethernet ring to be in the open state.

15. A method for determining a topology of devices in an Ethernet ring, comprising:
discovering, via a ring topology generator, a number and identification of a plurality of devices within the Ethernet ring; and
initiating, via the ring topology generator, a procedure to determine the topology of the devices in the Ethernet ring, the procedure comprising:
transmitting a first port disable command to a first device of the plurality of devices, wherein the first port disable command causes the first device to disable a first port of the first device;
storing an indication that the first device has been commanded to disable the first port of the first device;
detecting, by a second device of the plurality of devices, a terminated link at a first port of the second device;
sending, by the second device, a first message to the ring topology generator in response to the second device detecting the terminated link at the first port of the second device, the first message indicating that the first port of the second device is connected to a port that has been disabled; and
generating, by the ring topology generator, the topology of the Ethernet ring based on (1) the first message indicating that the first port of the second device is connected to the port that has been disabled and (2) the indication that the first device has been commanded to disable the first port of the first device.

16. The method of claim 15, wherein the topology indicates that the first port of the first device is connected to the first port of the second device.

17. The method of claim 15, the procedure further comprising the second device autonomously disabling a second port of the second device and sending a second message to the ring topology generator in response to detecting that the terminated link at the first port of the second device has been restored; and
the method further comprising repeating the detecting, sending, generating, and autonomously disabling steps of the procedure for each of the plurality of devices.

18. The method of claim 17, further comprising broadcasting a ring ordering complete message onto the Ethernet ring via the ring topology generator once each of the plurality devices discovered within the Ethernet ring has had one or more ports disabled.

19. The method of claim 15, further comprising:
broadcasting a device discovery command from the ring topology generator to the plurality of devices;
receiving device discovery information from one or more of the plurality of devices in response to the device discovery command; and
determining a state of the Ethernet ring based on the received device discovery information.

20. The method of claim 19, further comprising, upon receiving an indication that the Ethernet ring is in an open state, utilizing the topology of the Ethernet ring to determine a device failure or a link breakage causing the Ethernet ring to be in the open state.

\* \* \* \* \*